United States Patent
Imaeda

(10) Patent No.: US 9,951,697 B2
(45) Date of Patent: Apr. 24, 2018

(54) HEAT RELEASE RATE WAVEFORM CALCULATION APPARATUS AND HEAT RELEASE RATE WAVEFORM CALCULATION METHOD FOR INTERNAL COMBUSTION ENGINE

(71) Applicant: TOYOTA JIDOSHA KABUSHIKI KAISHA, Toyota-shi (JP)

(72) Inventor: Munenori Imaeda, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 104 days.

(21) Appl. No.: 15/050,859

(22) Filed: Feb. 23, 2016

(65) Prior Publication Data

US 2016/0245195 A1    Aug. 25, 2016

(30) Foreign Application Priority Data

Feb. 24, 2015 (JP) .................................. 2015-033999

(51) Int. Cl.
  *F02D 35/02* (2006.01)
  *G05B 17/02* (2006.01)
  *F02D 41/14* (2006.01)

(52) U.S. Cl.
  CPC ......... *F02D 35/026* (2013.01); *F02D 35/024* (2013.01); *F02D 35/028* (2013.01); *G05B 17/02* (2013.01); *F02D 35/02* (2013.01); *F02D 41/1406* (2013.01); *F02D 2041/1433* (2013.01)

(58) Field of Classification Search
  CPC .... F02D 35/026; F02D 35/024; F02D 35/028; F02D 35/02; F02D 41/1406; F02D 2041/1433; G05B 17/02

USPC .......................................................... 701/102
See application file for complete search history.

(56) References Cited

U.S. PATENT DOCUMENTS

| 6,502,549 B1 * | 1/2003 | Hoshino | F02D 35/023 123/406.12 |
| 2003/0159046 A1 * | 8/2003 | Choi | G06T 1/0042 713/176 |
| 2016/0053702 A1 | 2/2016 | Nada | |

FOREIGN PATENT DOCUMENTS

| EP | 3 135 887 A1 | 3/2017 | |
| EP | 3 135 888 A1 | 3/2017 | |
| JP | 2003148316 A | * 11/2001 | ............. Y02T 10/46 |
| JP | 2007177654 A | * 12/2005 | |
| JP | 2007-177654 A | 7/2007 | |

(Continued)

*Primary Examiner* — Lindsay Low
*Assistant Examiner* — Yi-Kai Wang
(74) *Attorney, Agent, or Firm* — Oblon, McClelland, Maier & Neustadt, L.L.P.

(57) ABSTRACT

A period from ignition timing to maximum heat release rate timing, at which a heat release rate is maximum, within a combustion period of air-fuel mixture is defined as a first combustion period that is one of characteristic values of a heat release rate waveform. The first combustion period is estimated based on a cylinder volume at the maximum heat release rate timing (maximum heat release rate cylinder volume) irrespective of any of an engine load factor, an EGR rate, an air-fuel ratio, an oil or coolant temperature and opening and closing timing of an exhaust valve through correction by the use of the exponential function of an engine rotation speed with an exponent of a value commensurate with a tumble ratio. The heat release rate waveform is calculated by using the estimated first combustion period.

14 Claims, 14 Drawing Sheets

(56) References Cited

FOREIGN PATENT DOCUMENTS

WO    WO 2014/155170 A1    10/2014
WO    WO 2015/162970 A1    10/2015

\* cited by examiner

HEAT RELEASE RATE WAVEFORM CALCULATION APPARATUS AND HEAT RELEASE RATE WAVEFORM CALCULATION METHOD FOR INTERNAL COMBUSTION ENGINE

INCORPORATION BY REFERENCE

The disclosure of Japanese Patent Application No. 2015-033999 filed on Feb. 24, 2015 including the specification, drawings and abstract is incorporated herein by reference in its entirety.

BACKGROUND

1. Technical Field

The disclosure relates to a heat release rate waveform calculation apparatus and heat release rate waveform calculation method for calculating a heat release rate waveform in a spark-ignition internal combustion engine and, more particularly, to a technique for obtaining a heat release rate waveform by focusing on a period from ignition of air-fuel mixture to timing at which a heat release rate is maximum (in this specification, this period is referred to as first combustion period).

2. Description of Related Art

Generally, in order to express a combustion state of an internal combustion engine, a heat release rate in a cylinder is approximated by the use of a Wiebe function. The Wiebe function is able to suitably express a heat release rate waveform by specifying a plurality of parameters, and is utilized to estimate a heat release rate, a mass fraction burned, or the like, in combustion of an internal combustion engine.

For example, in a method of determining the parameters of the Wiebe function, described in Japanese Patent Application Publication No. 2007-177654 (JP 2007-177654 A), a shape parameter m of the Wiebe function is identified by the use of a predetermined expression on the basis of a fraction burned at a crank angle at which a heat release rate is maximum. The other parameters, that is, k, $a/\theta_p^{m+1}$ and $\theta_b$, are also respectively identified by the use of predetermined expressions, and then the Wiebe function is determined so as to be adapted to an actual heat release pattern with high accuracy.

JP 2007-177654 A describes as follows. The plurality of parameters m, k, $a/\theta_p^{m+1}$, $\theta_b$ are identified in that way, and then work for determining the Wiebe function is performed for each of various operating conditions. Thus, the relationship between these parameters and operating parameters (load factor, rotation speed, air-fuel ratio, spark timing, and the like) of an internal combustion engine is acquired. JP 2007-177654 A further describes that, when the thus acquired relationship is utilized, it is possible to determine the Wiebe function for any operating condition of the internal combustion engine and express the combustion state of the internal combustion engine with high accuracy.

However, JP 2007-177654 A does not specifically describe a method of determining the relationship between the parameters m, k, $a/\theta_p^{m+1}$, $\theta_b$ of the Wiebe function and the operating parameters of the internal combustion engine. Therefore, actually, the parameters m, k, $a/\theta_p^{m+1}$, $\theta_b$ need to be identified for each of almost all the operating conditions, and then the Wiebe function needs to be determined for each of the operating conditions. That is, there is room for further reducing man-hours for generating heat release rate waveforms and reducing cost in the existing method.

With the above-described method, the entire heat release rate waveform is not expressed until parameters m, k, $a/\theta_p^{m+1}$, $\theta_b$ are identified and then the Wiebe function is determined, and, after that, the combustion state is allowed to be evaluated on the basis of the expressed entire heat release rate waveform. Thus, it is not possible to estimate and evaluate only, for example, a first combustion period (a period from ignition of air-fuel mixture to timing at which the heat release rate is maximum) with a simple method without expressing the entire heat release rate waveform.

SUMMARY

The disclosure focuses on a first combustion period that is one of indices indicating a combustion state, and is directed to reducing man-hours for generating (calculating) a heat release rate waveform and simply estimating and evaluating, for example, the first combustion period while ensuring desired accuracy.

The inventor of the disclosure obtained such new findings that a first combustion period, which is a period from the timing at which air-fuel mixture ignites as a result of spark ignition to the timing at which a heat release rate is maximum, highly correlates with a physical quantity at the timing at which the heat release rate is maximum without the influence of any of an engine load factor, an EGR rate, an air-fuel ratio, an oil or coolant temperature and opening and closing timing of an exhaust valve.

On the basis of the new findings, the principle of solution of the disclosure is that, at the time of calculating a heat release rate waveform by using the first combustion period that is one of characteristic values of the heat release rate waveform, the first combustion period is estimated irrespective of an engine load factor, an EGR rate, an air-fuel ratio, an oil or coolant temperature and opening and closing timing of an exhaust valve.

Specifically, an aspect of the disclosure provides a heat release rate waveform calculation apparatus for calculating a heat release rate waveform in a spark-ignition internal combustion engine. The heat release rate waveform calculation apparatus includes an electronic control unit. The electronic control unit is configured to: (i) define a period from ignition timing to maximum heat release rate timing within a combustion period of air-fuel mixture as a first combustion period that is one of characteristic values of the heat release rate waveform, the maximum heat release rate timing being timing at which a heat release rate is maximum, (ii) estimate the first combustion period based on a physical quantity at the maximum heat release rate timing irrespective of any of an engine load factor, an EGR rate, an air-fuel ratio, an oil or coolant temperature and opening and closing timing of an exhaust valve, and (iii) calculate the heat release rate waveform by using the estimated first combustion period.

According to the above aspect, at the time of calculating the waveform of a heat release rate in combustion of air-fuel mixture in a cylinder in the internal combustion engine, the first combustion period that is a period from the ignition timing of air-fuel mixture to the maximum heat release rate timing at which the heat release rate is maximum, is used as one of the characteristic values of the heat release rate waveform. The inventor of the disclosure found as the new findings that the first combustion period is influenced by the physical quantity at the maximum heat release rate timing without the influence of any of the operating parameters, that is, the load factor, the EGR rate, the air-fuel ratio, the oil or coolant temperature and the opening and closing timing of the exhaust valve of the internal combustion engine. Therefore, when the heat release rate waveform is calculated based on the first combustion period, it is not necessary to consider the operating parameters. Therefore, in comparison with the existing technique for generating a heat release rate waveform in consideration of the operating parameters, that is, the engine load factor, the EGR rate, the air-fuel ratio, the oil or coolant temperature and the opening and closing timing of the exhaust valve (by changing these operating parameters) (a plurality of parameters (such as a shape parameter) are identified for each of various operating conditions by the use of the Wiebe function), it is possible to reduce man-hours for generating heat release rate waveforms while guaranteeing sufficient accuracy.

Moreover, it is possible to estimate only the first combustion period based on the physical quantity at the maximum heat release rate timing as described above without generating the entire heat release rate waveform, so it is possible to easily estimate and evaluate the first combustion period while ensuring desired accuracy.

It is presumable that the first combustion period is significantly influenced by a disturbance in the cylinder. That is, it is presumable that, as the disturbance in the cylinder becomes stronger, flame spread becomes faster, and the first combustion period shortens. The disturbance in the cylinder changes in response to a cylinder volume. That is, as the cylinder volume at the maximum heat release rate timing increases (as a piston is positioned closer to the bottom dead center in combustion stroke), the disturbance in the cylinder becomes weaker. As the disturbance in the cylinder becomes weaker, flame spread becomes slower, and the first combustion period extends. Therefore, when the maximum heat release rate timing is on a retard side with respect to the timing at which the piston reaches the compression top dead center (TDC), as the cylinder volume at the maximum heat release rate timing increases, the disturbance in the cylinder becomes weaker, and the first combustion period extends. On the other hand, as the cylinder volume at the maximum heat release rate timing reduces, the disturbance in the cylinder becomes stronger, flame spread becomes faster, and the first combustion period shortens. In this way, the cylinder volume at the maximum heat release rate timing is a parameter that correlates with the disturbance in the cylinder. Therefore, the electronic control unit may be configured to calculate the first combustion period based on a cylinder volume at the maximum heat release rate timing. With this configuration, it is possible to calculate the first combustion period that reflects the influence of the disturbance in the cylinder, so the accuracy of estimating the first combustion period is sufficiently ensured, and the reliability of the heat release rate waveform calculated by using the first combustion period is also sufficiently ensured.

The disturbance in the cylinder changes depending on the engine rotation speed. That is, as the engine rotation speed decreases, the velocity of flow of air flowing from an intake system into the cylinder decreases, and the disturbance in the cylinder becomes weaker. As the disturbance in the cylinder becomes weaker, flame spread becomes slower, and the first combustion period extends. Conversely, as the engine rotation speed increases, the velocity of flow of air flowing from the intake system into the cylinder increases, and the disturbance in the cylinder becomes stronger. As the disturbance in the cylinder becomes stronger, flame spread becomes faster, and the first combustion period shortens. In this way, the engine rotation speed is also a parameter that correlates with the disturbance in the cylinder. Therefore, the electronic control unit may be configured to calculate the first combustion period by multiplying the first combustion period by a correction coefficient based on an engine rotation speed (for example, the exponential function of the engine rotation speed). With this configuration, it is possible to calculate the first combustion period that further reflects the influence of the disturbance in the cylinder, so the accuracy of estimating the first combustion period is sufficiently ensured, and the reliability of the heat release rate waveform calculated by using the first combustion period is also sufficiently ensured.

An example of the correction coefficient based on the engine rotation speed may be the exponential function of an engine rotation speed with an exponent of a value commensurate with a tumble ratio. The tumble ratio as well as the engine rotation speed significantly influences the disturbance in the cylinder. Therefore, by setting the correction coefficient based on the engine rotation speed to the exponential function of the engine rotation speed with an exponent of the value commensurate with the tumble ratio, it is possible to calculate the first combustion period that further reflects the influence of the disturbance in the cylinder, so the accuracy of estimating the first combustion period is sufficiently ensured.

A more specific technique for calculating the first combustion period is that virtual maximum heat release rate timing is set, and whether a virtual first combustion period obtained in accordance with the physical quantity at the virtual maximum heat release rate timing coincides with a period from actual ignition timing to the virtual maximum heat release rate timing is repeatedly calculated while changing the virtual maximum heat release rate timing. That is, the electronic control unit may be configured to (i) set virtual maximum heat release rate timing, (ii) compare a virtual first combustion period with the first combustion period estimated based on the physical quantity at the virtual maximum heat release rate timing, the virtual first combustion period being a period between the virtual maximum heat release rate timing and ignition timing obtained in accordance with actual spark timing, (iii) calculate the estimated first combustion period in the case where the virtual first combustion period and the estimated first combustion period coincide with each other as a true first combustion period, and (iv) calculate the heat release rate waveform by using the true first combustion period. With this configuration, it is possible to bring the virtual maximum heat release rate timing close to the true maximum heat release rate timing, so it is possible to accurately obtain the maximum heat release rate timing for estimating the first combustion period, and it is possible to calculate the first combustion period with high accuracy.

The heat release rate waveform that is calculated by using the first combustion period calculated as described above may be, for example, a triangular waveform of which a base is a crank angle period from ignition of air-fuel mixture to an end of combustion and a vertex is a heat release rate at the maximum heat release rate timing. When the heat release rate waveform is approximated by the triangular waveform, a base of a triangle that expresses a heat release rate from the ignition timing to the maximum heat release rate timing is defined as the first combustion period.

Another aspect of the disclosure provides a heat release rate waveform calculation method of calculating a heat release rate waveform in a spark-ignition internal combustion engine. That is, initially, a period from ignition timing to maximum heat release rate timing within a combustion period of air-fuel mixture is defined as a first combustion period that is one of characteristic values of the heat release rate waveform. The maximum heat release rate timing is timing at which a heat release rate is maximum. The first combustion period is estimated based on a physical quantity at the maximum heat release rate timing irrespective of any of an engine load factor, an EGR rate, an air-fuel ratio, an oil or coolant temperature and opening and closing timing of an exhaust valve. The heat release rate waveform is calculated by using the estimated first combustion period.

According to the disclosure, the first combustion period that is a period from the ignition timing of air-fuel mixture to the maximum heat release rate timing, at which the heat release rate is maximum, is used as one of the characteristic values of the heat release rate waveform in the internal combustion engine, and the first combustion period is estimated based on the physical quantity at the maximum heat release rate timing irrespective of any of the engine load factor, the EGR rate, the air-fuel ratio, the oil or coolant temperature and the opening and closing timing of the exhaust valve. Thus, it is possible to reduce man-hours that are required to generate the heat release rate waveform, and it is possible to easily estimate and evaluate the first combustion period without generating the entire heat release rate waveform while ensuring desired accuracy.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an embodiment will be described with reference to the accompanying drawings. In the present embodiment, a heat release rate waveform calculation apparatus that calculates (generates) a heat release rate waveform intended for a gasoline engine (spark-ignition engine) for an automobile will be described.

Figure 1:
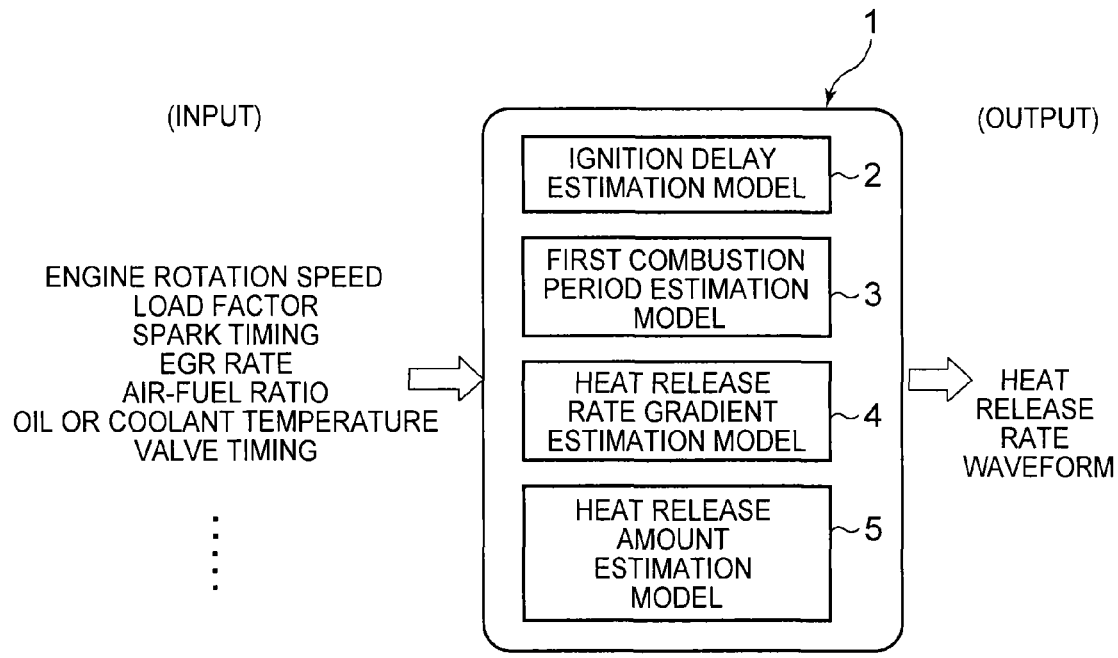
FIG. 1 is a view that shows the configuration of a heat release rate waveform calculation apparatus according to an embodiment and information input to or output from the heat release rate waveform calculation apparatus.

FIG. 1 is a view that shows the configuration of a heat release rate waveform calculation apparatus 1 according to the present embodiment and information input to or output from the heat release rate waveform calculation apparatus 1. Various pieces of information, such as state quantities of the engine, controlled variables and physical quantities of controlled parameters, are input to the heat release rate waveform calculation apparatus 1. These pieces of input information include an engine rotation speed, a load factor, spark timing, an EGR rate, an air-fuel ratio, an oil or coolant temperature, opening and closing timing of each of intake and exhaust valves (valve timing), and the like. The heat release rate waveform calculation apparatus 1 estimates various characteristic values of a heat release rate waveform with the use of estimation units 2 to 5 on the basis of the pieces of input information, and then outputs the heat release rate waveform generated by utilizing the various characteristic values. The estimation units 2 to 5 respectively store the following estimation models.

Estimation Units for Characteristic Values of Heat Release Rate Waveform

The heat release rate waveform calculation apparatus 1 includes the ignition delay estimation unit 2, the first combustion period estimation unit 3, the heat release rate gradient estimation unit 4 and the heat release amount estimation unit 5 in order to estimate an ignition delay, a first combustion period, a heat release rate gradient and a heat release amount as the characteristic values of a heat release rate waveform. The ignition delay estimation unit 2 stores an ignition delay estimation model. The first combustion period estimation unit 3 stores a first combustion period estimation model. The heat release rate gradient estimation unit 4 stores a heat release rate gradient estimation model. The heat release amount estimation unit 5 stores a heat release amount estimation model.

The ignition delay estimation unit 2 is a section that estimates an ignition delay period by the use of the ignition delay estimation model. The ignition delay period is a period from the timing (hereinafter, referred to as spark timing) at which spark is applied to air-fuel mixture by a spark plug of the engine, that is, spark discharge is performed between electrodes of the spark plug, to the timing (hereinafter, referred to as ignition timing) at which air-fuel mixture ignites due to the spark and an initial flame kernel is formed. The ignition delay period is expressed as a crank angle [CA]. In the present embodiment, the ignition timing is defined as the timing at which a heat release rate (a heat release amount per unit crank angle of rotation of a crankshaft) reaches 1 [J/CA] after the spark timing. The ignition timing is not limited to this timing and may be set as needed. For example, the timing at which a heat release amount after the spark timing reaches a predetermined percentage (for example, 5%) with respect to a total heat release amount may be defined as the ignition timing. Alternatively, the ignition timing may be defined on the basis of the timing at which the percentage of a heat release amount with respect to a total heat release amount reaches a predetermined value (for example, a crank angle position at the timing at which the percentage reaches 10%) and the timing at which the percentage of the heat release amount reaches another predetermined value (for example, a crank angle position at the timing at which the percentage reaches 50%). That is, a triangle (triangular waveform) approximated to a heat release rate waveform in a period during which the heat release rate is increasing is generated by using these crank angle positions and the percentage of the heat release amount, and then the ignition timing is defined on the basis of this triangular waveform. Alternatively, a heat release rate waveform may be generated by adapting the shape of a general heat release rate waveform in a period during which the heat release rate is increasing such that the relationship among the crank angle positions and the percentage of the heat release amount is established, and then the ignition timing may be defined on the basis of this heat release rate waveform. The values are not limited to these values. The values may be set as needed. In an actual machine of the engine, the spark timing is determined by executing the following control. In the control, the spark timing is advanced to approach a minimum spark advance for best torque (MBT) (optimal spark timing), and, when knocking is detected, the spark timing is retarded.

The first combustion period estimation unit 3 is a section that estimates a first combustion period by the use of the first combustion period estimation model. The first combustion period is a period from the ignition timing to the timing at which the heat release rate is maximum with the growth of a flame kernel (the timing at which the heat release rate is maximum in a period from the spark timing to combustion end timing) within a combustion period of air-fuel mixture. Hereinafter, the timing at which the heat release rate is maximum is referred to as maximum heat release rate timing. Each of the maximum heat release rate timing and the first combustion period is expressed as a crank angle [CA].

The heat release rate gradient estimation unit 4 is a section that estimates the average rate of increase in heat release rate (the gradient of heat release rate) with respect to a change in crank angle in the first combustion period, that is, the period from the ignition timing to the maximum heat release rate timing by the use of the heat release rate gradient estimation model. That is, in the present embodiment, as will be described below with reference to FIG. 2, a triangular waveform approximated to the heat release rate waveform is generated, and the heat release rate gradient estimation unit 4 estimates the gradient of an oblique line that expresses a heat release rate from the ignition timing to the maximum heat release rate timing in the triangular waveform. The gradient of the heat release rate is expressed in $J/CA^2$.

The heat release amount estimation unit 5 is a section that estimates a heat release amount generated as a result of combustion of air-fuel mixture (a heat release amount generated in the whole combustion period, and an integral value of the heat release rate in the period from the spark timing to the combustion end timing) by the use of the heat release amount estimation model. The heat release amount is expressed in J.

The characteristic values of the heat release rate waveform, such as the ignition delay, the first combustion period, the heat release rate gradient and the heat release amount, are respectively obtained by estimation operations in the estimation units 2 to 5, and the heat release rate waveform is generated by utilizing these characteristic values. The generated heat release rate waveform is the output of the heat release rate waveform calculation apparatus 1.

Figure 3:
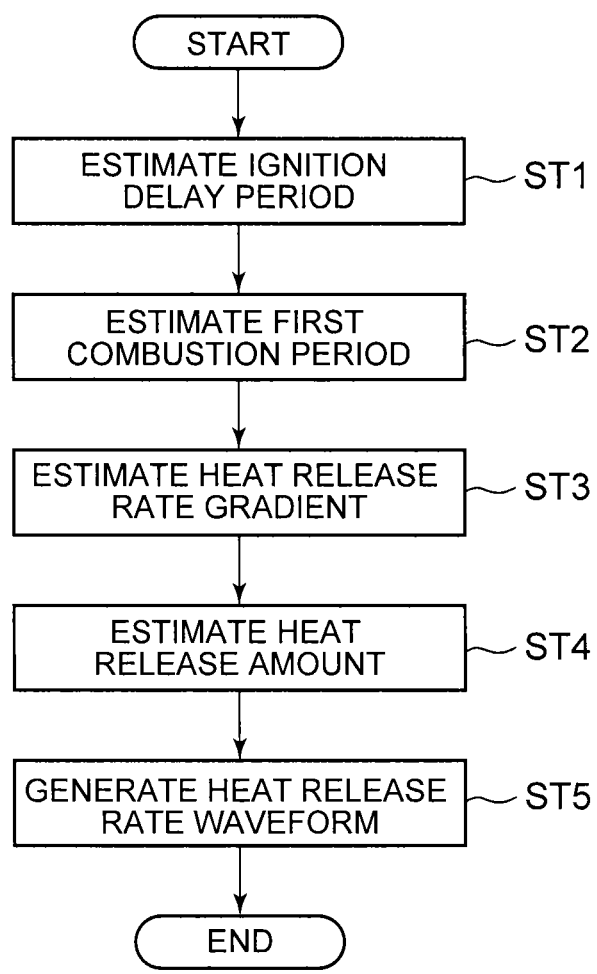
FIG. 3 is a flowchart that shows the procedure of generating a heat release rate waveform, which is executed in the heat release rate waveform calculation apparatus.

Therefore, in the heat release rate waveform calculation apparatus 1 according to the present embodiment, as shown in the flowchart of FIG. 3, the operation of estimating an ignition delay period in the ignition delay estimation unit 2 (step ST1), the operation of estimating a first combustion period in the first combustion period estimation unit 3 (step ST2), the operation of estimating a heat release rate gradient in the heat release rate gradient estimation unit 4 (step ST3) and the operation of estimating a heat release amount in the heat release amount estimation unit 5 (step ST4) are sequentially executed, and then the operation of generating a heat release rate waveform is executed by utilizing these estimated characteristic values (step ST5).

Figure 2:
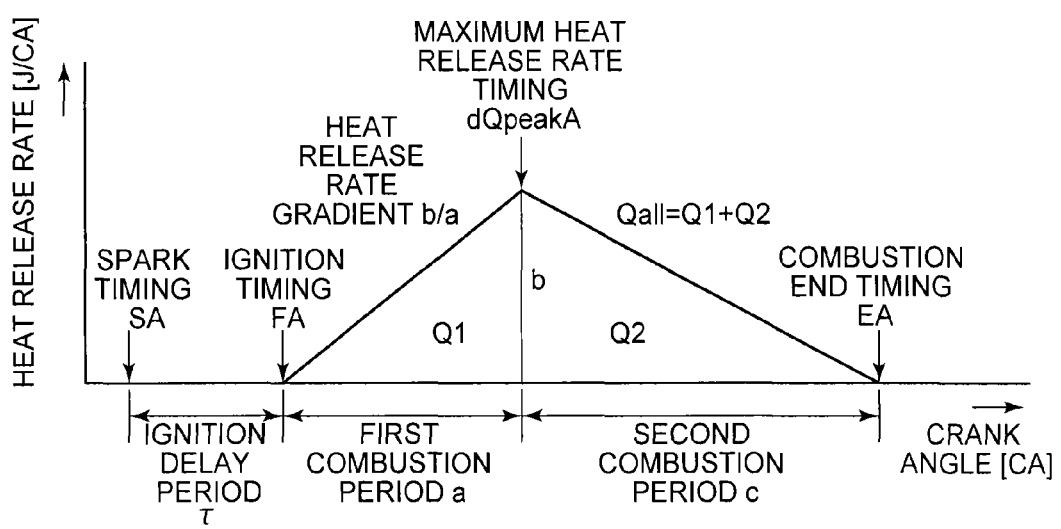
FIG. 2 is a view that shows an example of a heat release rate waveform that is output from the heat release rate waveform calculation apparatus.

FIG. 2 shows an example of the heat release rate waveform that is generated by utilizing the characteristic values estimated in the estimation units 2 to 5 and output from the heat release rate waveform calculation apparatus 1. The timing SA in FIG. 2 is the spark timing, and the timing FA in FIG. 2 is the ignition timing. Therefore, $\tau$ in FIG. 2 is the ignition delay period. In FIG. 2, dQpeakA denotes the maximum heat release rate timing, and a heat release rate at the maximum heat release rate timing dQpeakA is b in FIG. 2. That is, this heat release rate b is the maximum heat release rate in the combustion period. In FIG. 2, a that is the period from the ignition timing FA to the maximum heat release rate timing dQpeakA is the first combustion period. Therefore, the gradient of the heat release rate in the first combustion period a is expressed by b/a. In addition, in FIG. 2, c that is a period from the maximum heat release rate timing dQpeakA to the combustion end timing EA is a second combustion period. In FIG. 2, Q1 denotes a heat release amount in the first combustion period a, Q2 denotes a heat release amount in the second combustion period c. A heat release amount that is generated in the whole combustion period (total heat release amount $Q_{all}$) is expressed as the sum of these heat release amount Q1 and heat release amount Q2.

In other words, the heat release rate waveform calculation apparatus 1 according to the present embodiment approximates the heat release rate waveform by using a triangular waveform of which the base is a crank angle period from ignition of air-fuel mixture to the end of combustion (from FA to EA in FIG. 2) and the vertex is the heat release rate b at the maximum heat release rate timing dQpeakA. In this case, the base of a triangle that expresses the heat release rate from the ignition timing FA to the maximum heat release rate timing dQpeakA is the first combustion period a. In the present embodiment, system, control and adapted values are considered at the time of engine design by utilizing the heat release rate waveform that is the output of the heat release rate waveform calculation apparatus 1.

Hereinafter, estimation processes in the estimation units 2 to 5 will be specifically described.

Ignition Delay Estimation Unit

The ignition delay estimation unit 2 is a section that estimates the ignition delay period $\tau$ as described above. The ignition delay period $\tau$ is a period from the spark timing SA to the ignition timing FA.

The process of estimating the ignition delay period $\tau$, which is executed in the ignition delay estimation unit 2, is as follows.

The ignition delay period $\tau$ is estimated by utilizing any one of the following mathematical expression (1) and the mathematical expression (2) (these mathematical expressions correspond to the ignition delay estimation model).

$$\tau = C_1 \times \rho_{fuel@SA}{}^{\chi} \times Ne^{\delta} \quad (1)$$

$$\tau = C_2 \times \rho_{fuel@FA}{}^{\phi} \times Ne^{\psi} \quad (2)$$

$\rho_{fuel@SA}$ is a fuel density in a cylinder at the spark timing SA (In-cylinder fuel amount [mol]/Cylinder volume [L] at the spark timing). $\rho_{fuel@FA}$ denotes a fuel density in the cylinder at the ignition timing FA (In-cylinder fuel amount [mol]/Cylinder volume [L] at the ignition timing [L]). Ne denotes an engine rotation speed. $C_1$, $C_2$, $\chi$, $\delta$, $\phi$, $\psi$ denote coefficients that are identified on the basis of experiment, or the like.

These mathematical expression (1) and mathematical expression (2) are mathematical expressions that hold on the condition that the air-fuel ratio is a stoichiometric air-fuel ratio, the EGR rate is zero, warm-up operation of the engine is complete (the oil or coolant temperature is higher than or equal to a predetermined value), and the opening and closing timing of the intake valve is fixed.

The mathematical expression (1) is a mathematical expression for calculating the ignition delay period $\tau$ in the case where air-fuel mixture ignites at timing that is on an advance side with respect to the timing at which a piston reaches a compression top dead center (BTDC) (hereinafter, referred to as BTDC ignition). The mathematical expression (2) is a mathematical expression for calculating the ignition delay period $\tau$ in the case where air-fuel mixture ignites at timing that is on a retard side with respect to the timing (TDC) at which the piston reaches the compression top dead center (ATDC) (hereinafter, referred to as ATDC ignition).

As expressed by these mathematical expressions, the ignition delay period $\tau$ is calculated by the use of an arithmetic expression having the fuel density $\rho_{fuel}$ in the cylinder at predetermined timing and the engine rotation speed Ne as variables.

Grounds for allowing the ignition delay period $\tau$ to be calculated by the use of these mathematical expressions will be described below.

Figure 4:
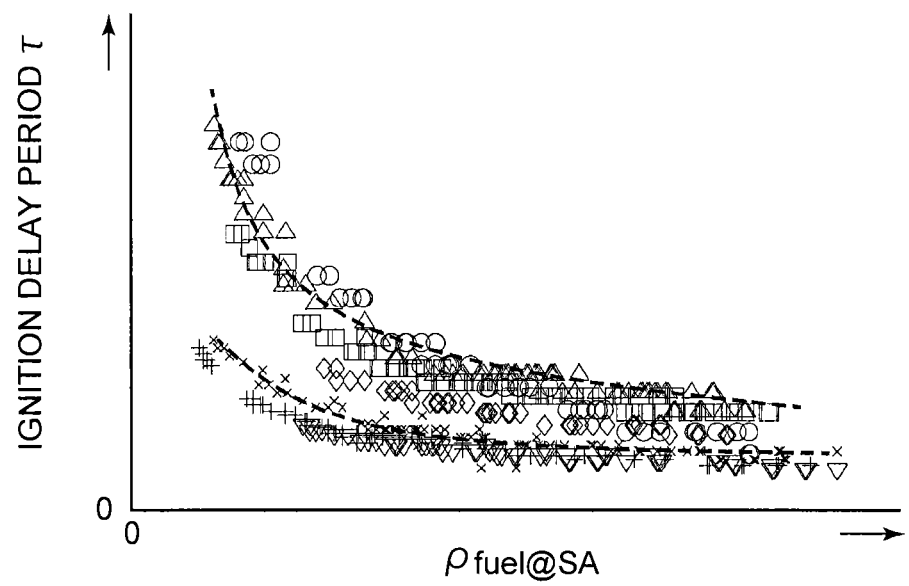
FIG. 4 is a graph that shows experimentally measured results of a change in ignition delay period with respect to a change in fuel density in a cylinder at spark timing in the case of BTDC ignition.

FIG. 4 is a graph that shows experimentally measured results of a change in ignition delay period $\tau$ with respect to a change in fuel density $\rho_{fuel@SA}$ in the cylinder at the spark timing SA in the case of BTDC ignition. This experiment was carried out in a state where the air-fuel ratio is the stoichiometric air-fuel ratio, the EGR rate is zero, the warm-up operation of the engine is complete (the oil or coolant temperature is higher than or equal to the predetermined value), and the opening and closing timing of the intake valve is fixed. In FIG. 4, the engine rotation speed Ne increases in order of "open circle", "open triangle", "open square", "open diamond", "cross", "plus mark" and "open inverted triangle". For example, "open circle" was obtained at 800 rpm, "open triangle" was obtained at 1000 rpm, "open square" was obtained at 1200 rpm, "open diamond" was obtained at 1600 rpm, "cross" was obtained at 2400 rpm, "plus mark" was obtained at 3200 rpm, and "open inverted triangle" was obtained at 3600 rpm.

As shown in FIG. 4, in the case of BTDC ignition, there is a correlation between the fuel density $\rho_{fuel@SA}$ in the cylinder at the spark timing SA and the ignition delay period $\tau$ for each engine rotation speed Ne. That is, the correlation is roughly expressed by a single curve. In FIG. 4, the correlation between the fuel density $\rho_{fuel@SA}$ in the cylinder at the spark timing SA and the ignition delay period $\tau$ is expressed by a single curve for each of the case where the engine rotation speed Ne is 1000 rpm and the case where the engine rotation speed Ne is 2400 rpm.

As shown in FIG. 4, as the fuel density $\rho_{fuel@SA}$ in the cylinder at the spark timing SA increases, the ignition delay period τ shortens. This is presumably because, as the fuel density $\rho_{fuel@SA}$ increases, the number of fuel molecules around the spark plug increases and, as a result, a flame kernel after sparking of the spark plug rapidly grows. The engine rotation speed Ne influences the ignition delay period τ. That is, as the engine rotation speed Ne increases, the ignition delay period τ shortens. This is presumably because a disturbance of the flow of air-fuel mixture (hereinafter, simply referred to as disturbance) becomes stronger as the engine rotation speed Ne increases and, as a result, the flame kernel rapidly grows. In this way, the fuel density $\rho_{fuel@SA}$ in the cylinder at the spark timing SA and the engine rotation speed Ne are parameters that influence the ignition delay period τ.

Figure 5:
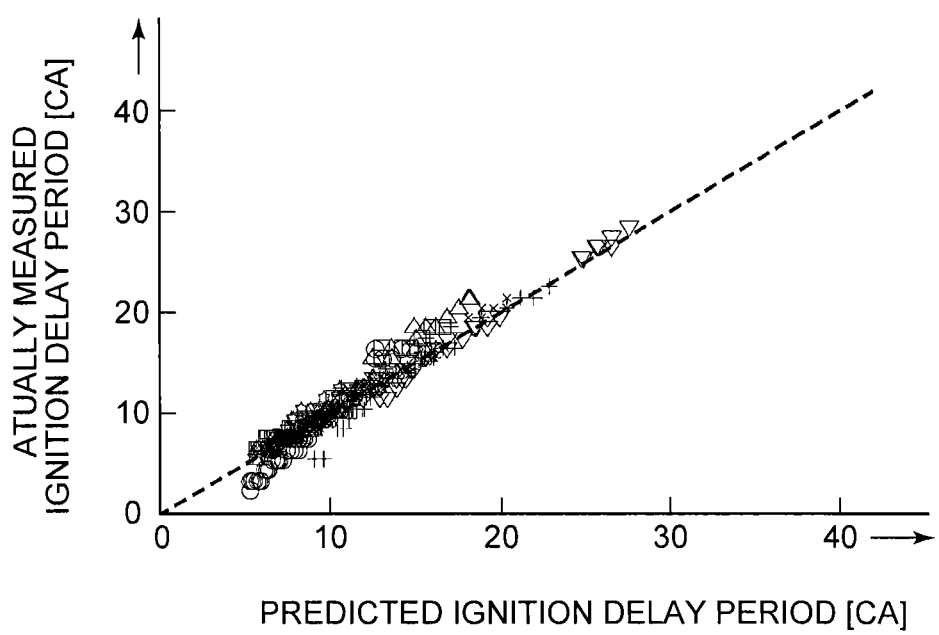
FIG. 5 is a graph that shows verified results of the relationship between predicted ignition delay periods calculated by the use of a mathematical expression (1) and actually measured ignition delay periods measured in an actual machine.

FIG. 5 is a graph that shows verified results of the relationship between predicted ignition delay periods calculated by the use of the mathematical expression (1) and actually measured ignition delay periods measured in an actual machine. In obtaining the predicted ignition delay periods, a prediction expression obtained by identifying the coefficients $C_1$, χ, δ in the mathematical expression (1) in response to an engine operating condition is used. In FIG. 5, the engine rotation speed Ne increases in order of "open circle", "open triangle", "open square", "open diamond", "cross", "plus mark", "open inverted triangle" and "open star". For example, "open circle" was obtained at 800 rpm, "open triangle" was obtained at 1000 rpm, "open square" was obtained at 1200 rpm, "open diamond" was obtained at 1600 rpm, "cross" was obtained at 2000 rpm, "plus mark" was obtained at 2400 rpm, "open inverted triangle" was obtained at 3200 rpm, and "open star" was obtained at 3600 rpm.

As is apparent from FIG. 5, the predicted ignition delay periods substantially coincide with the actually measured ignition delay periods, so it is clear that the ignition delay period in the case of BTDC ignition is calculated by the use of the mathematical expression (1) with high accuracy.

Figure 6:
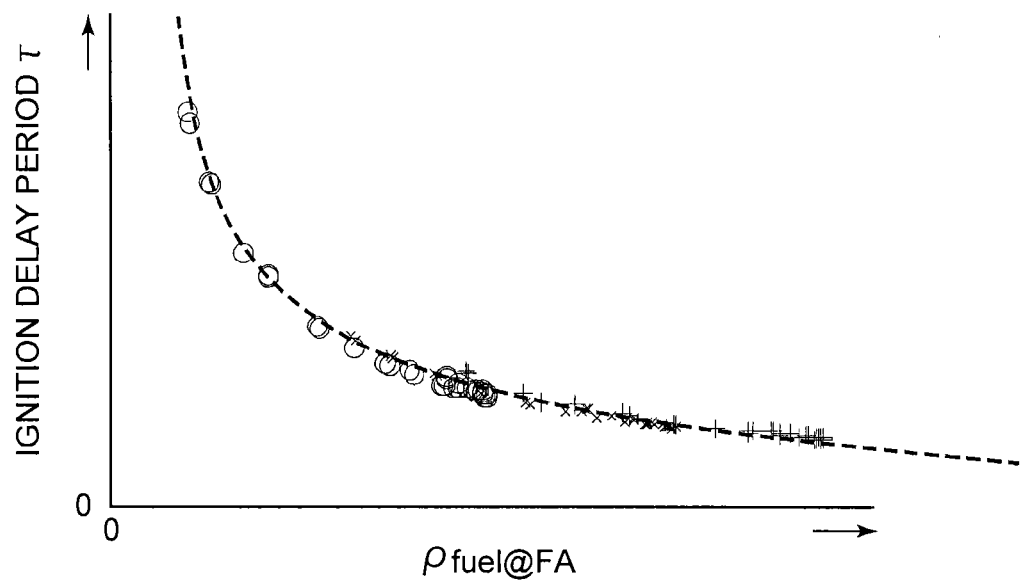
FIG. 6 is a graph that shows experimentally measured results of a change in ignition delay period with respect to a change in fuel density in the cylinder at ignition timing in the case of ATDC ignition.

FIG. 6 is a graph that shows experimentally measured results of a change in ignition delay period τ with respect to a change in fuel density $\rho_{fuel@FA}$ in the cylinder at the ignition timing FA in the case of ATDC ignition. This experiment was carried out in a state where the engine rotation speed is fixed, the air-fuel ratio is the stoichiometric air-fuel ratio, the EGR rate is zero, the warm-up operation of the engine is complete (the oil or coolant temperature is higher than or equal to the predetermined value) and the opening and closing timing of the intake valve is fixed. In FIG. 6, the engine load factor increases in order of "open circle", "cross", "plus mark" and "open triangle". For example, "open circle" was obtained at an engine load factor of 20%, "cross" was obtained at an engine load factor of 30%, "plus mark" was obtained at an engine load factor of 40% and "open triangle" was obtained at an engine load factor of 50%.

As shown in FIG. 6, in the case of ATDC ignition, there is a correlation between the fuel density $\rho_{fuel@FA}$ in the cylinder at the ignition timing FA and the ignition delay period τ irrespective of the engine load factor. That is, the correlation is roughly expressed by a single curve.

As shown in FIG. 6, as the fuel density $\rho_{fuel@FA}$ in the cylinder at the ignition timing FA increases, the ignition delay period τ shortens. This is presumably because, as the fuel density $\rho_{fuel@FA}$ increases, the number of fuel molecules around the spark plug increases and, as a result, a flame kernel after sparking of the spark plug rapidly grows, as described above. In this way, the fuel density $\rho_{fuel@FA}$ in the cylinder at the ignition timing FA is a parameter that influences the ignition delay period τ. As well as the above-described case, it is presumable that the engine rotation speed Ne is also a parameter that influences the ignition delay period τ.

Figure 7:
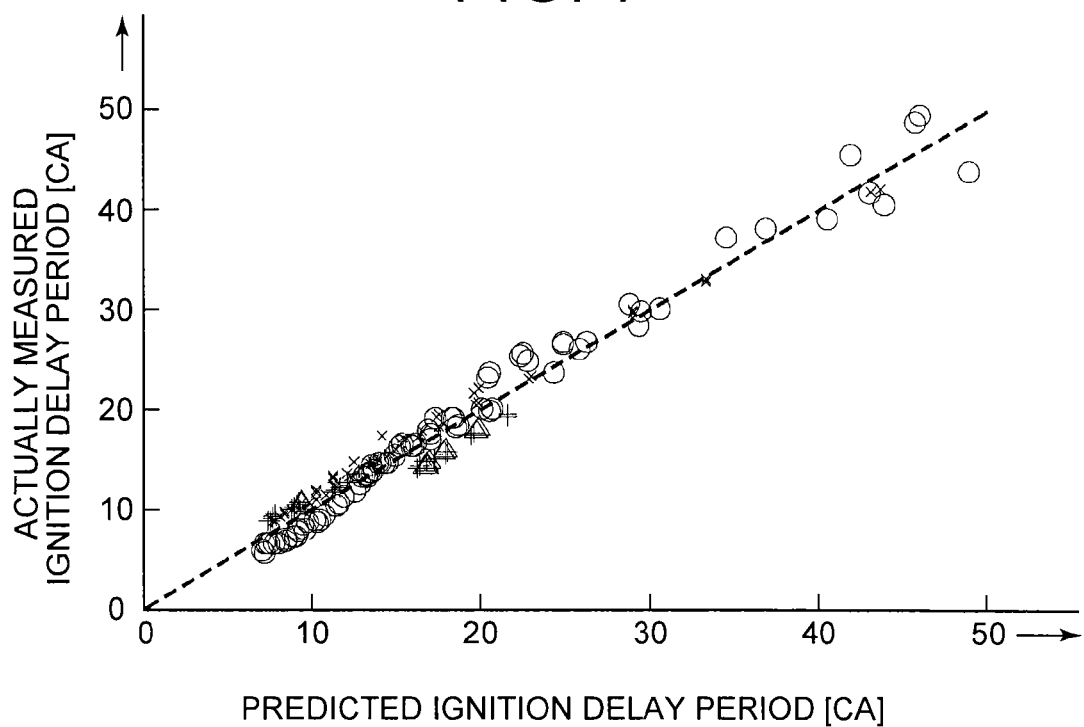
FIG. 7 is a graph that shows verified results of the relationship between predicted ignition delay periods calculated by the use of a mathematical expression (2) and actually measured ignition delay periods measured in an actual machine.

FIG. 7 is a graph that shows verified results of the relationship between predicted ignition delay periods calculated by the use of the mathematical expression (2) and actually measured ignition delay periods measured in an actual machine. In obtaining the predicted ignition delay periods, a prediction expression obtained by identifying the coefficients $C_2$, φ, ψ in the mathematical expression (2) in response to an engine operating condition is used. In FIG. 7, the engine rotation speed Ne increases in order of "open circle", "cross", "plus mark" and "open triangle". For example, "open circle" was obtained at 800 rpm, "cross" was obtained at 1200 rpm, "plus mark" was obtained at 3600 rpm, and "open triangle" was obtained at 4800 rpm.

As is apparent from FIG. 7, the predicted ignition delay periods substantially coincide with the actually measured ignition delay periods, so it is clear that the ignition delay period in the case of ATDC ignition is calculated by the use of the mathematical expression (2) with high accuracy.

The inventor of the disclosure derived the mathematical expression (1) and the mathematical expression (2) on the basis of these new findings.

Hereinafter, the reason why stratification is applied by ignition timing in calculating the ignition delay period τ will be described. That is, the reason why the case of BTDC ignition and the case of ATDC ignition are stratified and then the ignition delay period τ is calculated by the use of different arithmetic expressions (the mathematical expression (1) and the mathematical expression (2)) for the corresponding cases will be described.

Figure 8:
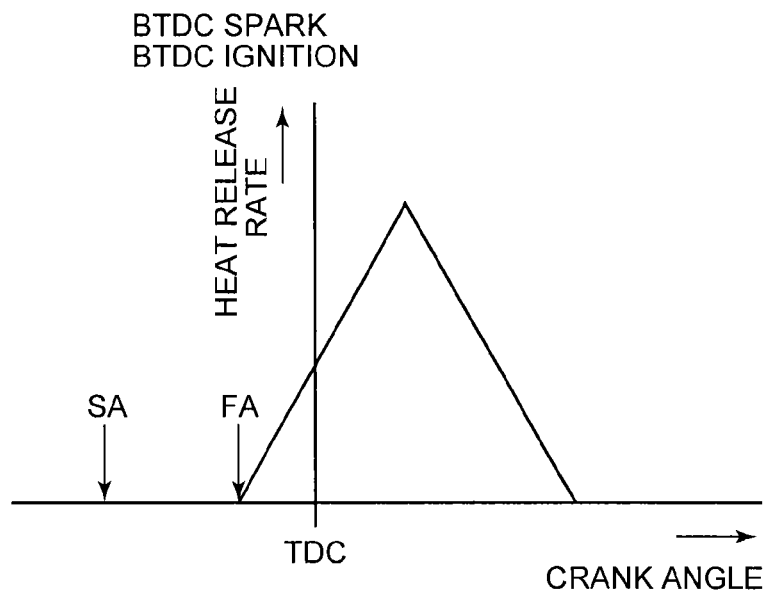
FIG. 8 is a view that shows spark timing and a heat release rate waveform in the case of BTDC ignition.

Initially, in the case of BTDC ignition, as shown in FIG. 8 (the graph that shows the spark timing SA and the heat release rate waveform), the spark timing SA is also on an advance side (BTDC) with respect to the timing at which the piston reaches the compression top dead center. In this case, after the spark timing SA, the piston moves toward the compression top dead center. That is, the cylinder volume reduces, and the fuel density $\rho_{fuel}$ increases accordingly. Therefore, as for the fuel density $\rho_{fuel}$, the fuel density $\rho_{fuel@SA}$ at the spark timing SA is smaller than the fuel density $\rho_{fuel@FA}$ at the ignition timing FA. By multiplying the various coefficients identified in advance by the fuel density $\rho_{fuel@SA}$ at the spark timing SA, which is a value that correlates with the maximum value of the ignition delay period (the longest ignition delay period from among estimated ignition delay periods), it is possible to obtain the ignition delay period τ with high accuracy.

Figure 9A:
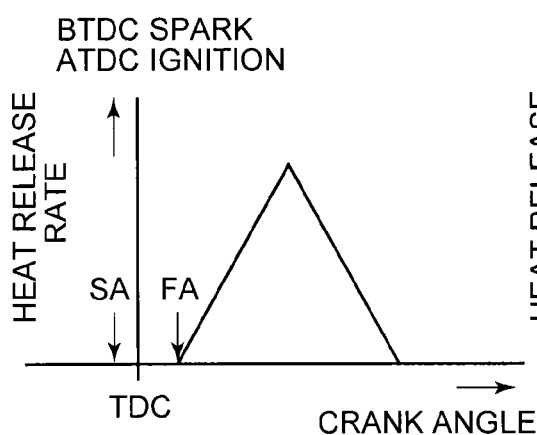
FIG. 9A is a graph that shows spark timing and a heat release rate waveform in the case of ATDC ignition when the spark timing is BTDC.
Figure 9B:
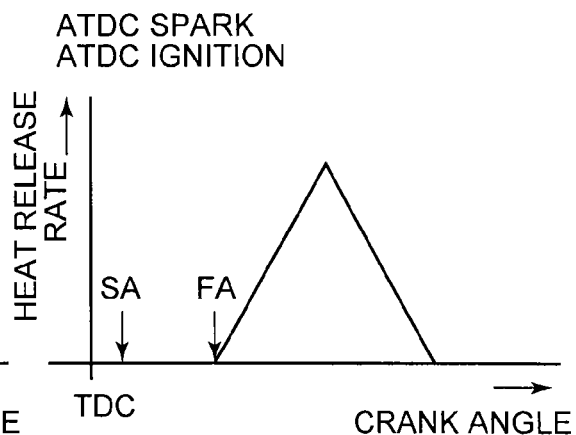
FIG. 9B is a graph that shows spark timing and a heat release rate waveform in the case of ATDC ignition when the spark timing is ATDC.

On the other hand, in the case of ATDC ignition, as shown in FIG. 9A and FIG. 9B (the graphs that show the spark timing SA and the heat release rate waveform), there are the case where the spark timing SA is on an advance side (BTDC) with respect to the timing at which the piston reaches the compression top dead center (see FIG. 9A) and the case where the spark timing SA is on a retard side (ATDC) with respect to the timing at which the piston reaches the compression top dead center (see FIG. 9B). In these cases, after the ignition timing FA, the piston moves toward the bottom dead center. That is, the cylinder volume increases, and the fuel density $\rho_{fuel}$ reduces accordingly. Therefore, as for the fuel density $\rho_{fuel}$, there is a possibility that the fuel density $\rho_{fuel@FA}$ at the ignition timing FA is smaller than the fuel density $\rho_{fuel@SA}$ at the spark timing SA. By multiplying the various coefficients identified in advance by the fuel density $\rho_{fuel@FA}$ at the ignition timing FA, which is a value that correlates with the maximum value of the ignition delay period (the longest ignition delay period from among estimated ignition delay periods), it is possible to obtain the ignition delay period τ with high accuracy.

The procedure of determining which one of these mathematical expression (1) and mathematical expression (2) is used (the procedure of determining whether the ignition timing is BTDC ignition or ATDC ignition) and the procedure of calculating the ignition delay period (true ignition delay period (described later)) will be described as follows. Initially, virtual ignition timing is set, and a cylinder volume at the virtual ignition timing is obtained. The cylinder volume is allowed to be geometrically obtained on the basis of a crank angle position (piston position) corresponding to the virtual ignition timing, so the cylinder volume is uniquely determined from the virtual ignition timing. The fuel density is obtained from the cylinder volume and a fuel injection amount. When the virtual ignition timing is set as BTDC ignition, an estimated ignition delay period is calculated by substituting the fuel density at the virtual ignition timing and the engine rotation speed into the mathematical expression (1). On the other hand, when the virtual ignition timing is set as ATDC ignition, an estimated ignition delay period is calculated by substituting the fuel density at the virtual ignition timing and the engine rotation speed into the mathematical expression (2). The timing advanced by the calculated estimated ignition delay period with respect to the virtual ignition timing is set as virtual spark timing. The virtual spark timing and actual spark timing (spark timing that is input information) are compared with each other. When the virtual spark timing does not coincide with the actual spark timing, the virtual ignition timing is changed. For example, the virtual ignition timing is changed toward a retard side. Again, the estimated ignition delay period is calculated by substituting the fuel density at the virtual ignition timing and the engine rotation speed into the mathematical expression (1) or the mathematical expression (2) (substituting the fuel density at the virtual ignition timing and the engine rotation speed into the mathematical expression (1) when the virtual ignition timing is set as BTDC ignition or substituting the fuel density at the virtual ignition timing and the engine rotation speed into the mathematical expression (2) when the virtual ignition timing is set as ATDC ignition), the virtual spark timing is obtained, and then the virtual spark timing is compared with actual spark timing (spark timing that is input information). This operation is repeated, and the virtual ignition timing in the case where the virtual spark timing coincides with actual spark timing is obtained as true ignition timing. At this time (at the time when the true ignition timing is obtained), the estimated ignition delay period calculated by the use of the mathematical expression (1) or the mathematical expression (2) is obtained as a true ignition delay period. The ignition delay period τ may be calculated by substituting the obtained ignition timing into the mathematical expression (1) again when the true ignition timing is BTDC (in the case of BTDC ignition), and the ignition delay period τ may be calculated again by substituting the obtained ignition timing into the mathematical expression (2) when the true ignition timing is ATDC (in the case of ATDC ignition).

The above-described operation is rephrased as follows. A period between the actual spark timing and the virtual ignition timing (a virtual ignition delay period on the assumption that ignition occurs at the virtual ignition timing) is compared with the estimated ignition delay period calculated (estimated) by the use of the mathematical expression (1) or the mathematical expression (2). When these periods do not coincide with each other, the virtual ignition timing is changed. Again, after the estimated ignition delay period is calculated by the use of the mathematical expression (1) or the mathematical expression (2), a period between the actual spark timing and the virtual ignition timing (virtual ignition delay period) is compared with the estimated ignition delay period calculated by the use of the mathematical expression (1) or the mathematical expression (2). This operation is repeated, and the estimated ignition delay period in the case where these periods coincide with each other (the virtual ignition delay period and the estimated ignition delay period coincide with each other) is obtained as a true ignition delay period.

With the above-described estimation of the ignition delay period τ by the ignition delay estimation unit 2, the ignition delay period τ is allowed to be estimated over all the engine operating region.

When the ignition delay period τ is calculated as described above, it is possible to obtain the ignition timing FA by adding the ignition delay period τ to the spark timing SA.

First Combustion Period Estimation Unit

The first combustion period estimation unit 3 is a section that estimates the first combustion period a, as described above. The first combustion period a is a period from the ignition timing FA to the maximum heat release rate timing dQpeakA.

The process of estimating the first combustion period a, which is executed in the first combustion period estimation unit 3, will be described as follows.

The first combustion period a [CA] is estimated by utilizing the following mathematical expression (3) (this mathematical expression corresponds to the first combustion period estimation model).

$$a = C \times V_{@dQpeak}{}^{\alpha} \times Ne^{\beta} \qquad (3)$$

$V_{@dQpeak}$ denotes a cylinder volume [L] as a physical quantity at the maximum heat release rate timing dQpeakA, and, hereinafter, also referred to as maximum heat release rate cylinder volume. Ne denotes the engine rotation speed.

This mathematical expression (3) is a mathematical expression that holds on the condition that the opening and closing timing of the intake valve is fixed. In addition, this mathematical expression (3) holds without the influence of any of the engine load factor, the EGR rate, the air-fuel ratio, the oil or coolant temperature and the opening and closing timing of the exhaust valve. That is, the mathematical expression (3) holds on the basis of the fact that the first combustion period a is not influenced by any of the engine load factor, the EGR rate, the air-fuel ratio, the oil or coolant temperature and the opening and closing timing of the exhaust valve.

Grounds for allowing the first combustion period a to be calculated by the use of this mathematical expression (3) will be described below.

Figure 10:
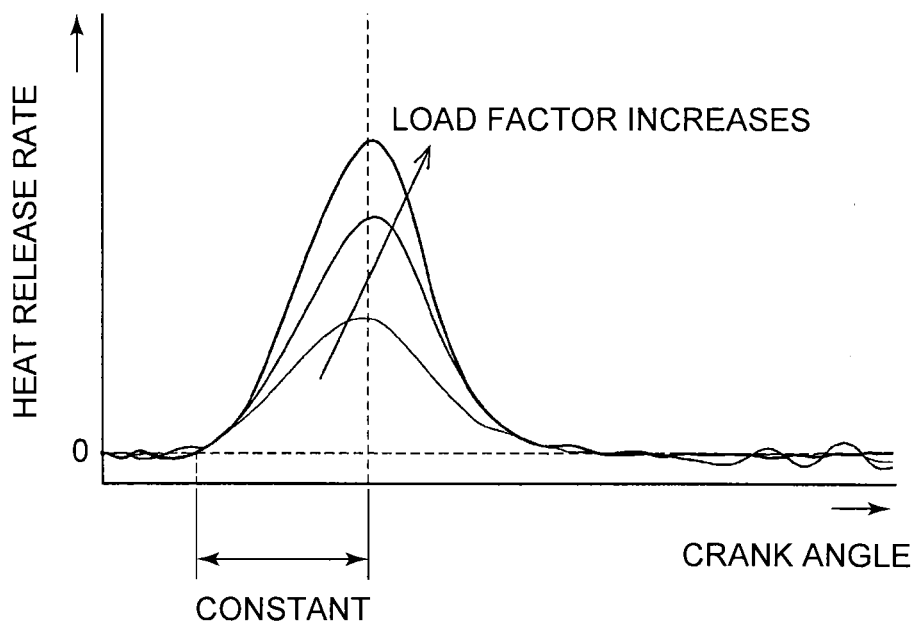
FIG. 10 is a graph that shows heat release rate waveforms that are obtained in engine operating states of which only engine load factors are different from one another and that overlappingly shows the heat release rate waveforms of which the spark timings are adjusted such that maximum heat release rate timings coincide with one another.
Figure 11:
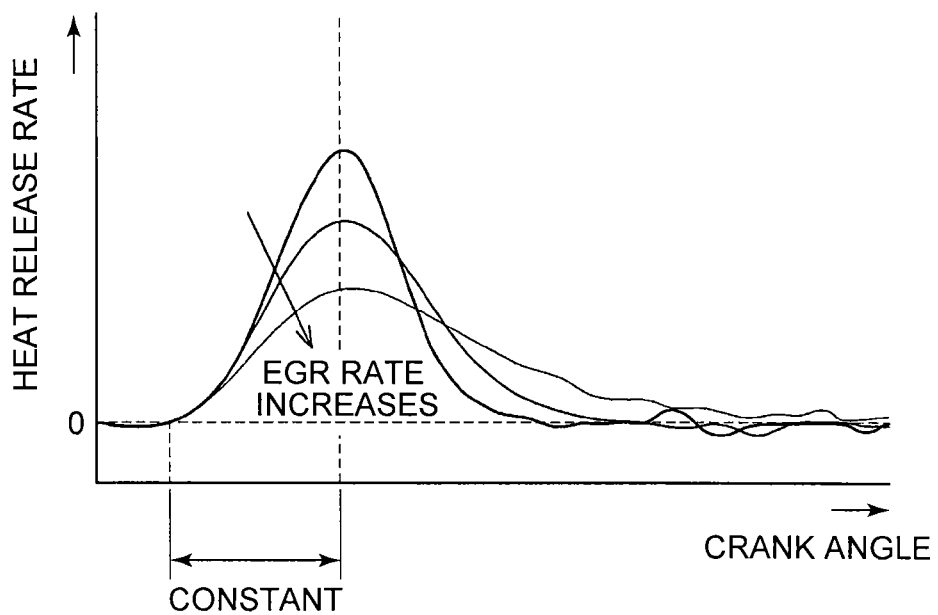
FIG. 11 is a graph that shows heat release rate waveforms that are obtained in engine operating states of which only EGR rates are different from one another and that overlappingly shows the heat release rate waveforms of which the spark timings are adjusted such that maximum heat release rate timings coincide with one another.
Figure 12:
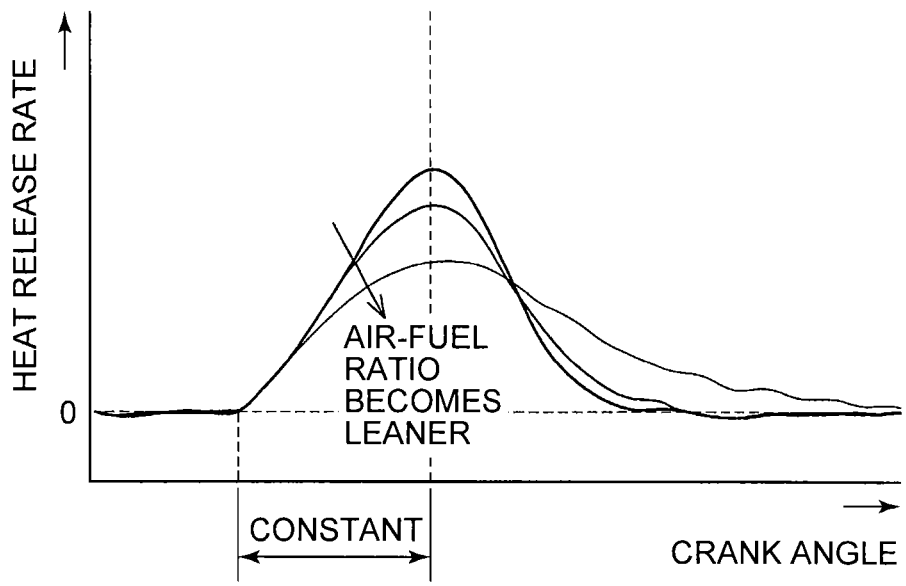
FIG. 12 is a graph that shows heat release rate waveforms that are obtained in engine operating states of which only air-fuel ratios are different from one another and that overlappingly shows the heat release rate waveforms of which the spark timings are adjusted such that maximum heat release rate timings coincide with one another.
Figure 13:
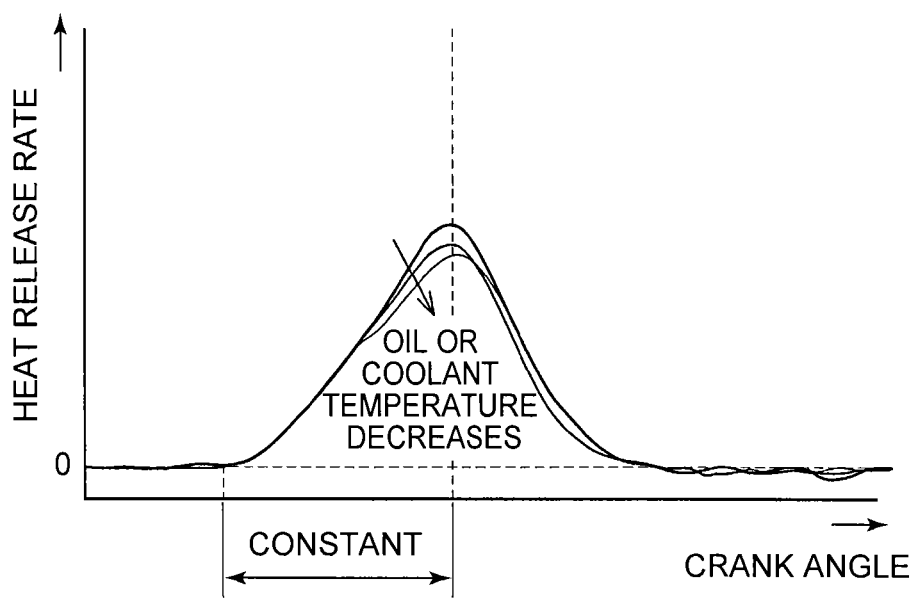
FIG. 13 is a graph that shows heat release rate waveforms that are obtained in engine operating states of which only oil or coolant temperatures are different from one another and that overlappingly shows the heat release rate waveforms of which the spark timings are adjusted such that maximum heat release rate timings coincide with one another.
Figure 14:
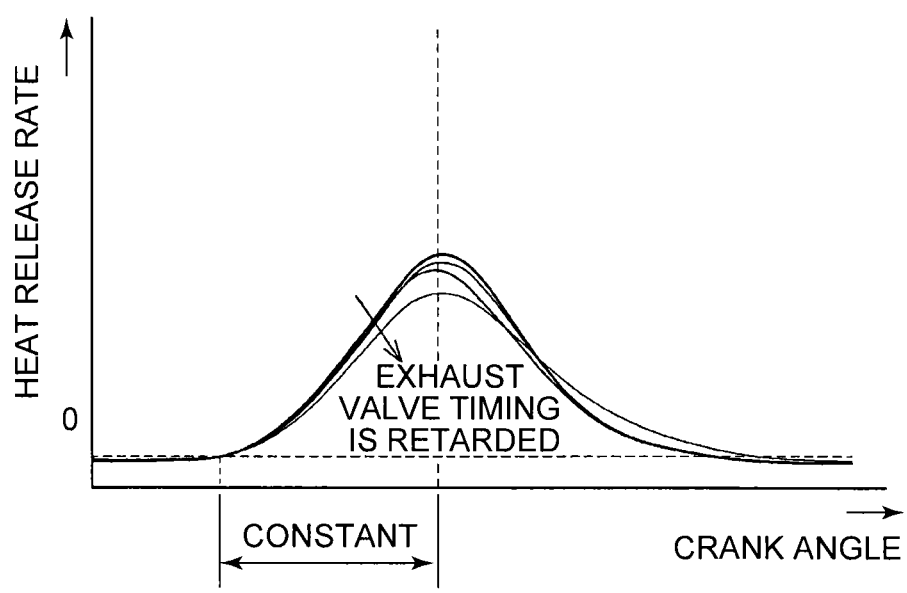
FIG. 14 is a graph that shows heat release rate waveforms that are obtained in engine operating states of which only the opening and closing timings of an exhaust valve are different from one another and that overlappingly shows the heat release rate waveforms of which the spark timings are adjusted such that maximum heat release rate timings coincide with one another.

FIG. 10 to FIG. 14 each are heat release rate waveforms that are obtained in mutually different engine operating states and each overlappingly show the heat release rate waveforms of which the spark timings SA are adjusted such that the maximum heat release rate timings dQpeakA coincide with one another. FIG. 10 overlappingly shows the heat release rate waveforms that are obtained in the engine operating states of which only the engine load factors are different from one another. FIG. 11 overlappingly shows the heat release rate waveforms that are obtained in the engine operating states of which only the EGR rates are different from one another. FIG. 12 overlappingly shows the heat release rate waveforms that are obtained in the engine operating states of which only the air-fuel ratios are different from one another. FIG. 13 overlappingly shows the heat release rate waveforms that are obtained in the case where only the oil or coolant temperatures are different from one another as in the case of the middle of the warm-up operation of the engine. FIG. 14 overlappingly shows the heat release rate waveforms that are obtained in the engine operating states of which only the opening and closing timings of the exhaust valve are different from one another.

As shown in FIG. 10 to FIG. 14, the first combustion period a is kept constant even when any of the engine load factor, the EGR rate, the air-fuel ratio, the oil or coolant temperature and the opening and closing timing of the exhaust valve changes. That is, it is clear that the first combustion period a is not influenced by any of the engine load factor, the EGR rate, the air-fuel ratio, the oil or coolant temperature and the opening and closing timing of the exhaust valve.

Figure 15A:
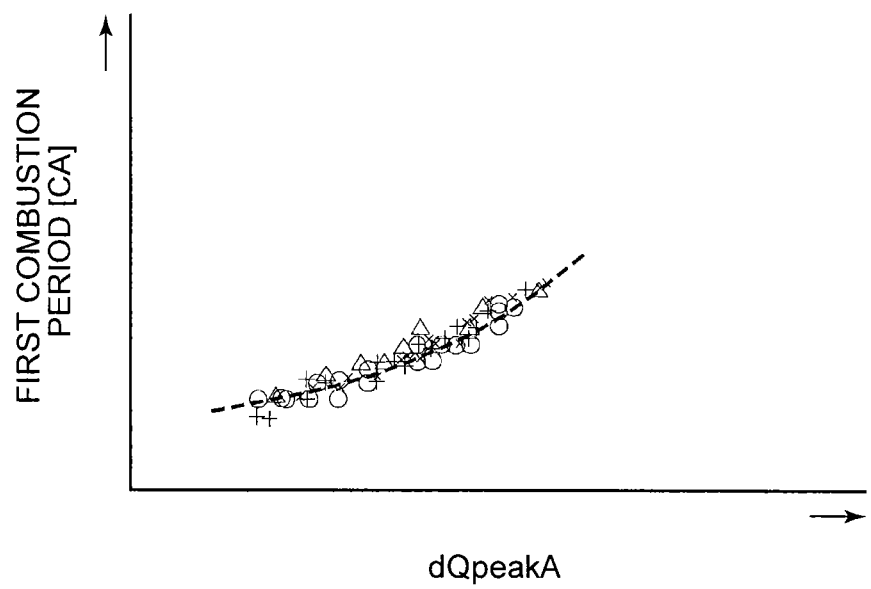
FIG. 15A and FIG. 15B are graphs that respectively show experimentally investigated results of the relationship between maximum heat release rate timings and first combustion periods for mutually different opening and closing timings of the exhaust valve.
Figure 15B:
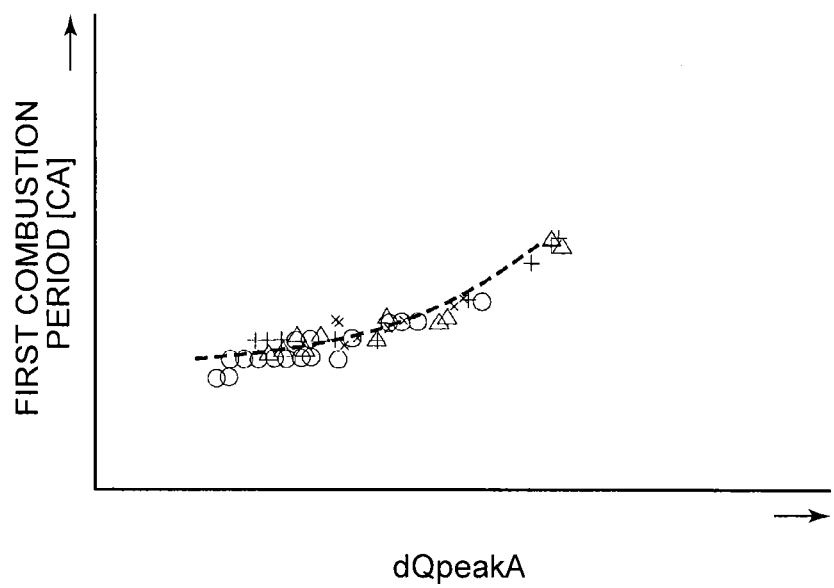

The inventor of the disclosure further carried out an experiment for confirming that the first combustion period a is not influenced by the opening and closing timing of the exhaust valve. FIG. 15A and FIG. 15B are graphs that respectively show experimentally investigated results of the relationship between the maximum heat release rate timings dQpeakA and the first combustion periods a for the mutually different opening and closing timings of the exhaust valve. This experiment was carried out in a state where the engine rotation speed, the opening and closing timing of the intake valve, the engine load factor and the spark timing are fixed, the air-fuel ratio is the stoichiometric air-fuel ratio, the EGR rate is zero and the warm-up operation of the engine is complete (the oil or coolant temperature is higher than or equal to the predetermined value). The engine rotation speed in FIG. 15A and the engine rotation speed in FIG. 15B are different from each other. In each of FIG. 15A and FIG. 15B, the opening and closing timing of the exhaust valve is on a retard side in order of "open circle", "cross", "plus mark" and "open triangle". For example, "open circle" indicates the most advanced opening and closing timing, "cross" indicates the opening and closing timing retarded by 10° from the most advanced opening and closing timing, "plus mark" indicates the opening and closing timing retarded by 20° from the most advanced opening and closing timing, and "open triangle" indicates the opening and closing timing retarded by 30° from the most advanced opening and closing timing.

As shown in FIG. 15A and FIG. 15B, there is a correlation between the maximum heat release rate timing dQpeakA and the first combustion period a irrespective of the opening and closing timing of the exhaust valve. That is, the correlation is roughly expressed by a single curve. It is also clear from this experiment that the first combustion period a is not influenced by the opening and closing timing of the exhaust valve.

Figure 16:
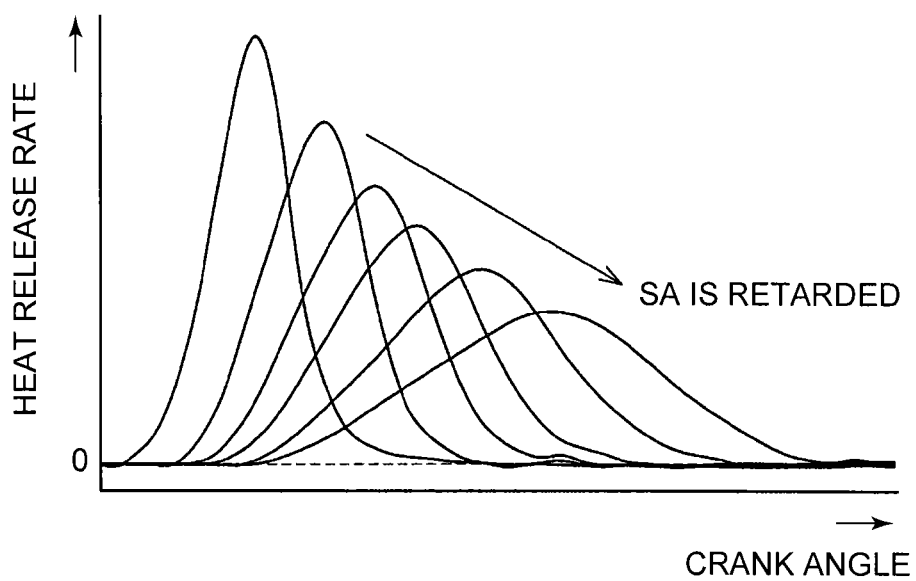
FIG. 16 is a graph that overlappingly shows heat release rate waveforms that are obtained in engine operating states of which only the spark timings are different from one another.

On the other hand, FIG. 16 overlappingly shows heat release rate waveforms that are obtained in engine operating states of which only the spark timings SA are different from one another. As is apparent from FIG. 16, as the spark timing SA is retarded, the first combustion period a extends.

Figure 17:
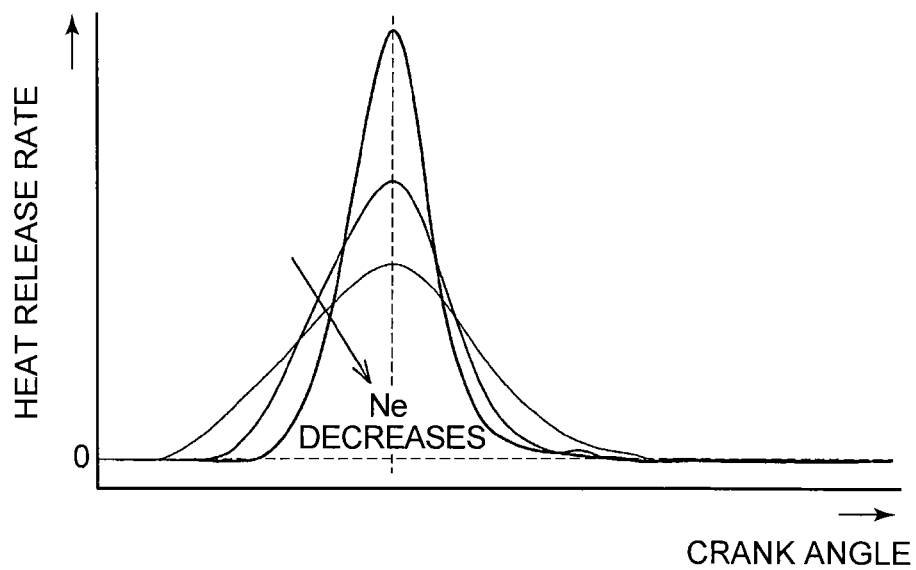
FIG. 17 is a graph that shows heat release rate waveforms that are obtained in engine operating states of which only engine rotation speeds are different from one another and that overlappingly shows the heat release rate waveforms of which the spark timings are adjusted such that maximum heat release rate timings coincide with one another.

FIG. 17 shows heat release rate waveforms that are obtained in engine operating states of which only the engine rotation speeds Ne are different from one another and overlappingly shows the heat release rate waveforms of which the spark timings SA are adjusted such that the maximum heat release rate timings dQpeakA coincide with one another. As is apparent from FIG. 17, as the engine rotation speed Ne decreases, the first combustion period a extends.

In this way, it is clear that the first combustion period a is influenced by the spark timing SA and the engine rotation speed Ne.

The influence of the spark timing SA and the engine rotation speed Ne on a disturbance in the cylinder is regarded as a factor that the first combustion period a is influenced by the spark timing SA and the engine rotation speed Ne.

That is, on the assumption that the maximum heat release rate timing dQpeakA is on a retard side with respect to TDC, as the spark timing SA shifts toward a retard side, the ignition timing FA and the maximum heat release rate timing dQpeakA shift toward a retard side, the cylinder volume at the maximum heat release rate timing dQpeakA (maximum heat release rate cylinder volume $V_{@dQpeak}$) increases, and the disturbance in the cylinder becomes weaker. As the disturbance in the cylinder becomes weaker, flame spread becomes slower, so the first combustion period a extends. Conversely, as the spark timing SA shifts toward an advance side, the ignition timing FA and the maximum heat release rate timing dQpeakA also shift toward an advance side, the maximum heat release rate cylinder volume $V_{@dQpeak}$ reduces, and the disturbance in the cylinder becomes stronger. Thus, flame spread becomes faster, so the first combustion period a shortens.

As the engine rotation speed Ne decreases, the velocity of flow of air flowing from an intake system into the cylinder decreases, so the disturbance in the cylinder becomes weaker. As the disturbance in the cylinder becomes weaker, flame spread becomes slower, so the first combustion period a extends. Conversely, as the engine rotation speed Ne increases, the velocity of flow of air flowing from the intake system into the cylinder increases, so the disturbance in the cylinder becomes stronger. As the disturbance in the cylinder becomes stronger, flame spread becomes faster, so the first combustion period a shortens.

The inventor of the disclosure derived the mathematical expression (3) on the basis of this new findings. In this mathematical expression (3), the cylinder volume is used as a physical quantity that correlates with the spark timing SA that is a controlled variable, particularly, the maximum heat release rate cylinder volume $V_{@dQpeak}$ is used as a variable. That is, as described above, as the spark timing SA shifts toward a retard side, the maximum heat release rate timing dQpeakA also shifts toward a retard side, and the cylinder volume $V_{@dQpeak}$ increases, so, as a physical quantity that correlates with the spark timing SA, the maximum heat release rate cylinder volume $V_{@dQpeak}$ is used as a variable.

The procedure of obtaining the maximum heat release rate cylinder volume $V_{@dQpeak}$ that is a variable of the mathematical expression (3) and the procedure of calculating the first combustion period a will be described as follows. Initially, virtual maximum heat release rate timing is set, and a cylinder volume at the virtual maximum heat release rate timing is obtained. The cylinder volume is allowed to be geometrically obtained on the basis of a crank angle position (piston position) corresponding to the virtual maximum heat release rate timing, so the cylinder volume is uniquely determined from the virtual maximum heat release rate timing. An estimated first combustion period is calculated by substituting the cylinder volume at the virtual maximum heat release rate timing and the engine rotation speed into the mathematical expression (3). The timing advanced by the calculated estimated first combustion period with respect to the virtual maximum heat release rate timing is set as virtual ignition timing. Because the ignition delay period τ is calculated in the above-described ignition delay estimation unit 2, it is possible to calculate the ignition timing FA by adding the ignition delay period τ to the spark timing SA. The virtual ignition timing is compared with the calculated ignition timing FA. When the virtual ignition timing does not coincide with the calculated ignition timing FA, the virtual maximum heat release rate timing is changed. For example, the virtual maximum heat release rate timing is changed toward a retard side. Again, the estimated first combustion period is calculated by substituting the cylinder volume at the virtual maximum heat release rate timing and the engine rotation speed into the mathematical expression (3), the virtual ignition timing is obtained, and then the virtual ignition timing is compared with the calculated ignition timing FA (the ignition timing FA that is obtained by adding the ignition delay period τ calculated in the ignition delay estimation unit 2 to the spark timing SA). This operation is repeated, and the virtual maximum heat release rate timing in the case where the virtual ignition timing coincides with the calculated ignition timing FA is obtained as true maximum heat release rate timing dQpeakA. At this time (at the time when the true maximum heat release rate timing dQpeakA is obtained), the estimated first combustion period calculated in the mathematical expression (3) is obtained as a true first combustion period. The maximum heat release rate cylinder volume $V_{@dQpeak}$ at the true maximum heat release rate timing dQpeakA is allowed to be geometrically obtained, and the first combustion period a may be calculated by substituting this maximum heat release rate cylinder volume $V_{@dQpeak}$ into the mathematical expression (3).

The above-described operation is rephrased as follows. A period between the ignition timing FA (the ignition timing obtained in accordance with the actual spark timing) and the virtual maximum heat release rate timing (virtual first combustion period) is compared with the estimated first combustion period calculated (estimated) by the use of the mathematical expression (3) (the first combustion period estimated on the basis of the physical quantity at the virtual maximum heat release rate timing). When these periods do not coincide with each other, the virtual maximum heat release rate timing is changed. Again, the estimated first combustion period is calculated by the use of the mathematical expression (3), and then the period between the ignition timing FA and the virtual maximum heat release rate timing (virtual first combustion period) is compared with the estimated first combustion period calculated by the use of the mathematical expression (3). This operation is repeated, and the estimated first combustion period in the case where these periods coincide with each other (the virtual first combustion period and the estimated first combustion period coincide with each other) is obtained as a true first combustion period a.

The coefficients in the mathematical expression (3) will be specifically described. C and α are obtained as a result of identification based on experiment, or the like. β is a value commensurate with a tumble ratio in the cylinder, and is a value that increases as the tumble ratio increases. β may be set as a result of identification based on experiment, or the like. These coefficients may also be identified with respect to a change in the opening and closing timing of the intake valve. In this way, the mathematical expression (3) is configured to calculate the first combustion period a by multiplying the maximum heat release rate cylinder volume $V_{@dQpeak}$ by the exponential function (correction coefficient) of the engine rotation speed Ne with an exponent of the value β commensurate with the tumble ratio.

Figure 18:
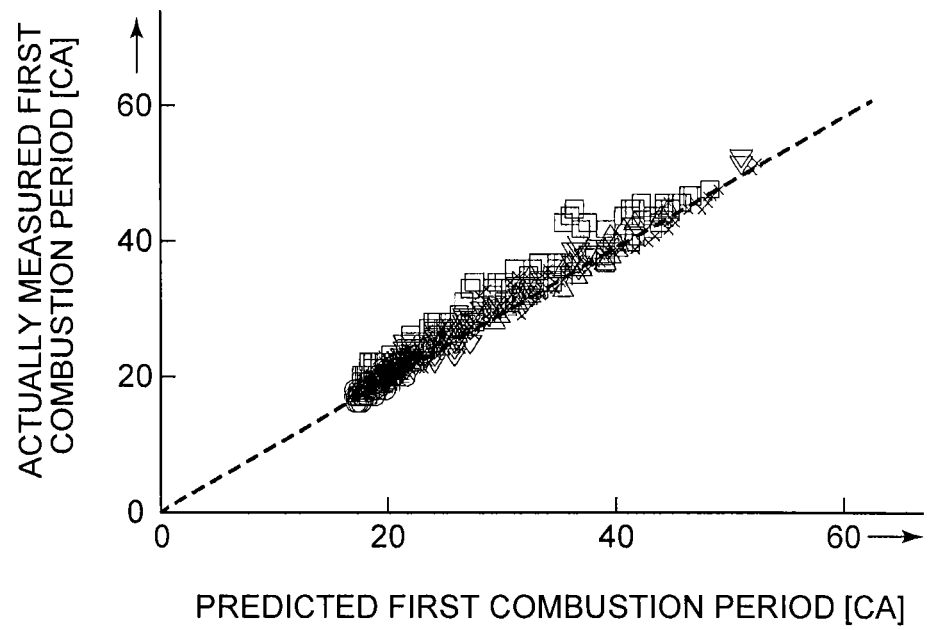
FIG. 18 is a graph that shows verified results of the relationship for an engine between predicted first combustion periods calculated by the use of a mathematical expression (3) and actually measured first combustion periods measured in an actual machine.
Figure 19:
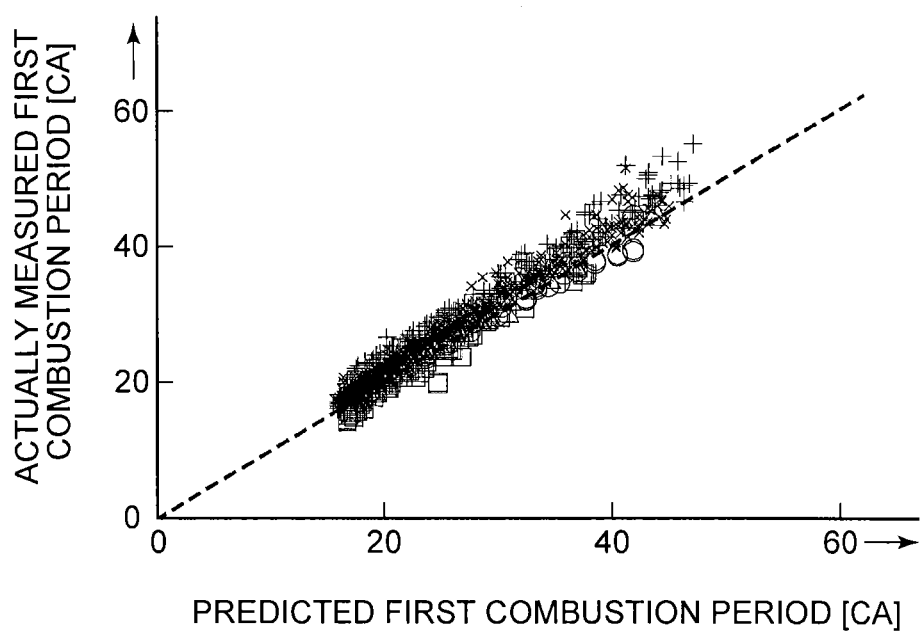
FIG. 19 is a graph that shows verified results of the relationship for another engine between predicted first combustion periods calculated by the use of the mathematical expression (3) and actually measured first combustion periods measured in an actual machine.
Figure 20A:
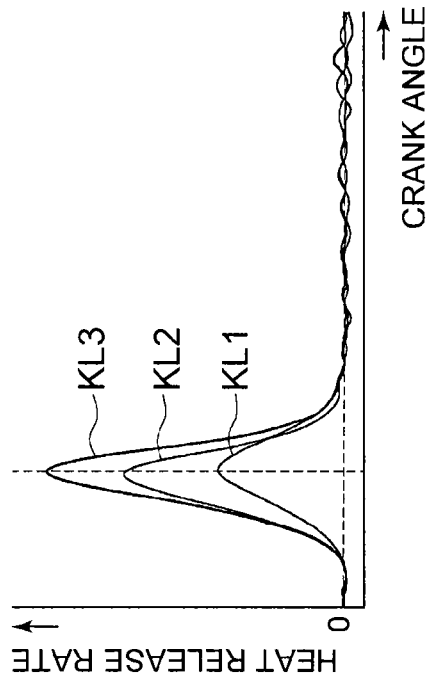
FIG. 20A to FIG. 20D are graphs, each of which shows heat release rate waveforms that are obtained in engine operating states of which only engine load factors are different from one another and which overlappingly shows the heat release rate waveforms of which the spark timings are adjusted such that maximum heat release rate timings coincide with one another.
Figure 20B:
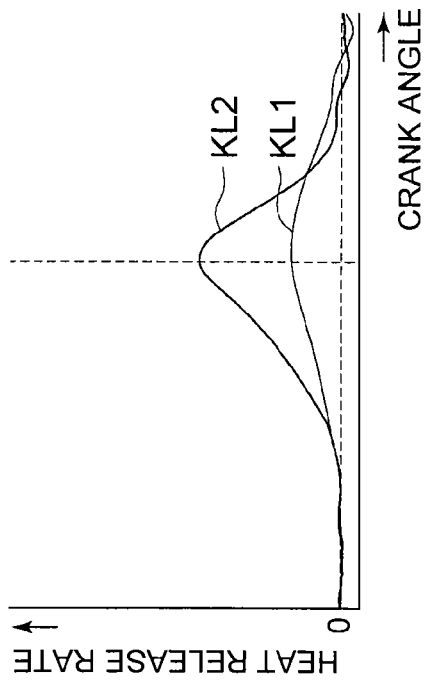
Figure 20C:
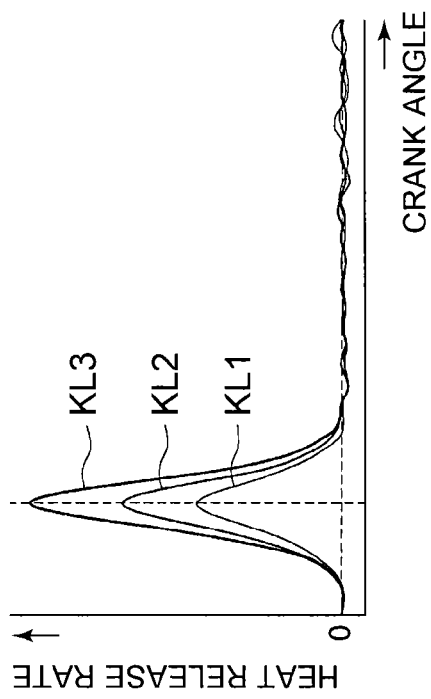
Figure 20D:
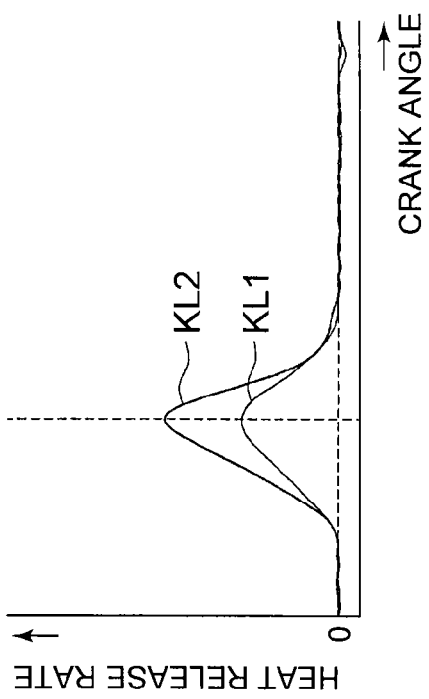

FIG. 18 and FIG. 19 are graphs that respectively show verified results of the relationship between predicted first combustion periods calculated by the use of the mathematical expression (3) and actually measured first combustion periods measured in an actual machine for mutually different engines. In obtaining the predicted first combustion periods, a prediction expression obtained by identifying the coefficient C in the mathematical expression (3) in response to an engine operating condition is used. In FIG. 18, the engine rotation speed Ne increases in order of "open circle", "open triangle", "open square", "open diamond", "cross", "plus mark" and "open inverted triangle". For example, "open circle" was obtained at 800 rpm, "open triangle" was obtained at 1000 rpm, "open square" was obtained at 1200 rpm, "open diamond" was obtained at 1600 rpm, "cross" was obtained at 2400 rpm, "plus mark" was obtained at 3200 rpm and "open inverted triangle" was obtained at 3600 rpm. In FIG. 19, the engine rotation speed Ne increases in order of "open circle", "cross", "plus mark", "open triangle" and "open square". For example, "open circle" was obtained at 800 rpm, "cross" was obtained at 1200 rpm, "plus mark" was obtained at 2400 rpm, "open triangle" was obtained at 3600 rpm, and "open square" was obtained at 4800 rpm.

As is apparent from FIG. 18 and FIG. 19, the predicted first combustion periods substantially coincide with the actually measured first combustion periods, so it is clear that the first combustion period a is calculated by the use of the mathematical expression (3) with high accuracy.

As described above, it is possible to estimate the first combustion period a on the basis of the maximum heat release rate cylinder volume $V_{@dQpeak}$ and the engine rotation speed Ne on the assumption that the first combustion period a is not influenced by any of the engine load factor, the EGR rate, the air-fuel ratio, the oil or coolant temperature and the opening and closing timing of the exhaust valve. These maximum heat release rate cylinder volume $V_{@dQpeak}$ and engine rotation speed Ne are parameters that correlate with the disturbance in the cylinder as described above. In other words, it is presumable that the engine load factor, the EGR rate, the air-fuel ratio and the oil or coolant temperature do not influence the first combustion period a because these almost do not correlate with the disturbance in the cylinder. Even when the opening and closing timing of the exhaust valve changes, the first combustion period a already ends at the timing at which the exhaust valve opens, so it is presumable that the opening and closing timing of the exhaust valve does not influence the first combustion period a. It is possible to estimate the first combustion period a on the basis of the maximum heat release rate cylinder volume $V_{@dQpeak}$ and the engine rotation speed Ne that are parameters that correlate with the disturbance in the cylinder without consideration of these engine load factor, EGR rate, air-fuel ratio, oil or coolant temperature and opening and closing timing of the exhaust valve. Therefore, man-hours for determining first combustion periods a in various operating conditions of the engine are significantly reduced.

As described above, the first combustion period is not influenced by the engine load factor. The engine load factor is one of parameters for controlling a fuel injection amount, and the fuel injection amount is a controlled parameter that influences the fuel density in the cylinder. Therefore, the first combustion period is estimated irrespective of the fuel density in the cylinder. Specifically, as described above, the first combustion period is estimated on the basis of parameters that influence the disturbance in the cylinder, that is, the maximum heat release rate cylinder volume $V_{@dQpeak}$ and the engine rotation speed Ne. In contrast, as will be described later, the heat release rate gradient is estimated on the basis of the fuel density in the cylinder. In this way, the first combustion period and the heat release rate gradient that are estimated in the present embodiment are estimated as mutually independent (not dependent) values.

Heat Release Rate Gradient Estimation Unit

The heat release rate gradient estimation unit 4 is a section that estimates the gradient b/a of the heat release rate (hereinafter, referred to as heat release rate gradient) in the first combustion period a as described above.

The process of estimating the heat release rate gradient b/a, which is executed in the heat release rate gradient estimation unit 4, will be described as follows.

The heat release rate gradient b/a [J/CA$^2$] is basically estimated by the use of the following mathematical expression (4) (this mathematical expression corresponds to the heat release rate gradient estimation model).

$$\frac{b}{a} = C_3 \times \rho_{fuel@dQpeak} \qquad (4)$$

$\rho_{fuel@dQpeak}$ denotes a fuel density at the maximum heat release rate timing dQpeakA (In-cylinder fuel amount [mol]/Cylinder volume [L] at the maximum heat release rate timing), and, hereinafter, also referred to as maximum heat release rate fuel density. $C_3$ denotes a coefficient that is identified on the basis of experiment, or the like.

This mathematical expression (4) is a mathematical expression that holds on the condition that the engine rotation speed is fixed, the air-fuel ratio is the stoichiometric air-fuel ratio, the EGR rate is zero, the warm-up operation of the engine is complete (the oil or coolant temperature is higher than or equal to the predetermined value) and the opening and closing timing of the intake valve is fixed. The influence of the engine rotation speed, the EGR rate, the air-fuel ratio, the oil or coolant temperature of the engine, and the like, will be described later.

Grounds for allowing the heat release rate gradient b/a to be calculated by the use of the mathematical expression (4) will be described below.

FIG. 20A to FIG. 20D are graphs, each of which shows heat release rate waveforms that are obtained in engine operating states of which only engine load factors are different from one another and which overlappingly shows the heat release rate waveforms of which the spark timings SA are adjusted such that maximum heat release rate timings dQpeakA coincide with one another. The spark timing changes toward a retard side in order of FIG. 20A to FIG. 20D, and, in each of the graphs, the engine load factor increases in order of KL1, KL2, KL3. For example, in FIG. 20A to FIG. 20D, KL1 was obtained at an engine load factor of 20%, KL2 was obtained at an engine load factor of 30%, and KL3 was obtained at an engine load factor of 40%.

As shown in FIG. 20A to FIG. 20D, the heat release rate gradient b/a is influenced by the engine load factor and the spark timing SA. Specifically, in any of FIG. 20A to FIG. 20D in which the spark timings SA are different from one another, the heat release rate gradient b/a increases as the engine load factor increases. In this way, the fact that the fuel density in the cylinder changes in response to the engine load factor is regarded as a factor that the heat release rate gradient b/a is influenced by the engine load factor. That is, it is presumable that, because the in-cylinder fuel amount increases as the engine load factor increases, the fuel density in the cylinder also increases and, as a result, the combustion speed of air-fuel mixture increases.

With a shift of the spark timing SA toward a retard side in order of FIG. 20A to FIG. 20D, the heat release rate gradient b/a decreases. Each of FIG. 21A and FIG. 21B overlappingly shows heat release rate waveforms that are obtained in engine operating states of which only the spark timings SA are different from each other in order to investigate the influence of a change in spark timing SA. In each of FIG. 21A and FIG. 21B, the engine load factors are different from one another, and, in any of the engine load factors, the heat release rate gradient b/a tends to decrease with a shift of the spark timing SA toward a retard side.

In this way, it is presumable that the factor that the heat release rate gradient b/a is influenced by the spark timing SA is also due to the fuel density in the cylinder as in the case of the above-described engine load factor. That is, when the piston is positioned around the compression top dead center (TDC), a change in cylinder volume resulting from a change in crank angle is small; however, the cylinder volume increases with distance from the TDC toward a retard side in an expansion stroke (for example, from about ATDC 10° CA), and the fuel density in the cylinder decreases accordingly.

Figure 21A:
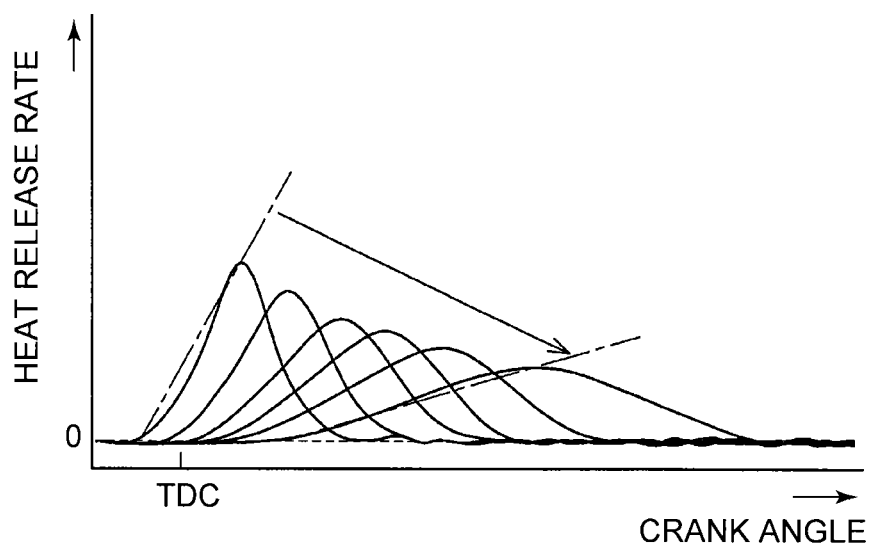
FIG. 21A and FIG. 21B each overlappingly show heat release rate waveforms that are obtained in engine operating states of which only the spark timings are different from one another.
Figure 21B:
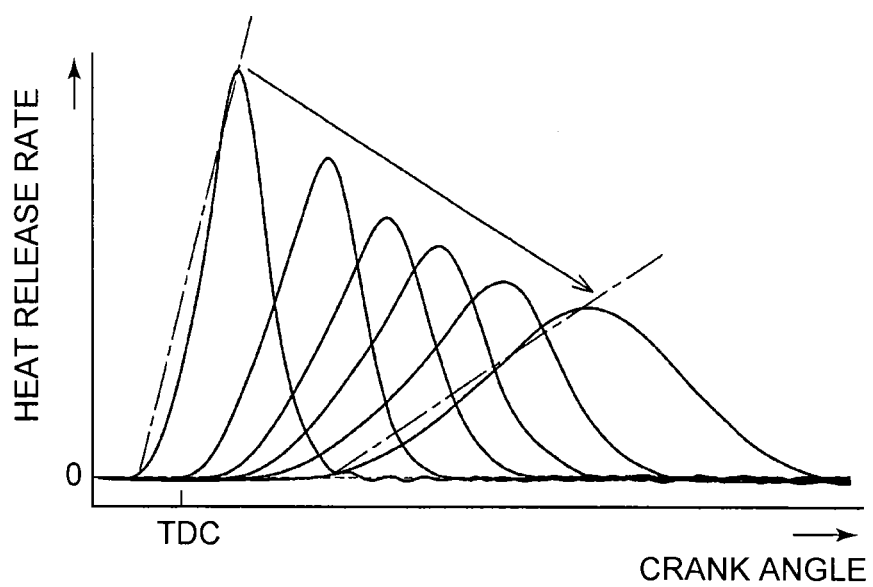

As shown in FIG. 21A and FIG. 21B, the heat release rate waveform shifts toward a retard side as a whole as the spark timing SA is retarded, and, when the ignition timing FA (the start point of the waveform) becomes the timing after the TDC, the gradient of the heat release rate waveform also gradually reduces. As a result, the gradient of a straight line (indicated by the alternate long and short dashes line in the graphs) that connects from the ignition timing FA (the start point of the waveform) to a heat release rate b (the vertex of the waveform) at the maximum heat release rate timing dQpeakA, that is, the heat release rate gradient b/a, is also gradually reduced toward a retard side.

In this way, the influence of retardation of the spark timing SA (that is, retardation of the ignition timing FA) on the heat release rate gradient b/a remarkably appears in the relationship between the heat release rate gradient b/a and the maximum heat release rate fuel density $\rho_{fuel@dQpeak}$. That is, as shown in FIG. 21A and FIG. 21B, the maximum heat release rate timing dQpeakA shifts toward a retard side as the spark timing SA is retarded, and, when the cylinder volume at the maximum heat release rate timing dQpeakA (maximum heat release rate cylinder volume $V_{@dQpeak}$) gradually increases, the maximum heat release rate fuel density $\rho_{fuel@dQpeak}$ reduces in response to an increase in maximum heat release rate cylinder volume $V_{@dQpeak}$, and the heat release rate gradient b/a reduces accordingly.

The inventor investigated how the heat release rate gradient b/a changes in correspondence with a change in maximum heat release rate fuel density $\rho_{fuel@dQpeak}$ in that way. The results of the experiment are shown in the graphs of FIG. 22A to FIG. 22D. In each of these graphs, the engine load factor increases in order of "open circle", "cross", "plus mark", "open triangle", "open square", "open diamond", "open inverted triangle" and "open star". For example, in each of FIG. 22A to FIG. 22D, "open circle" was obtained at an engine load factor of 15%, "cross" was obtained at an engine load factor of 20%, "plus mark" was obtained at an engine load factor of 25%, "open triangle" was obtained at an engine load factor of 30%, "open square" was obtained at an engine load factor of 35%, "open diamond" was obtained at an engine load factor of 40%, "open inverted triangle" was obtained at an engine load factor of 45%, and "open star" was obtained at an engine load factor of 50%.

Figure 22A:
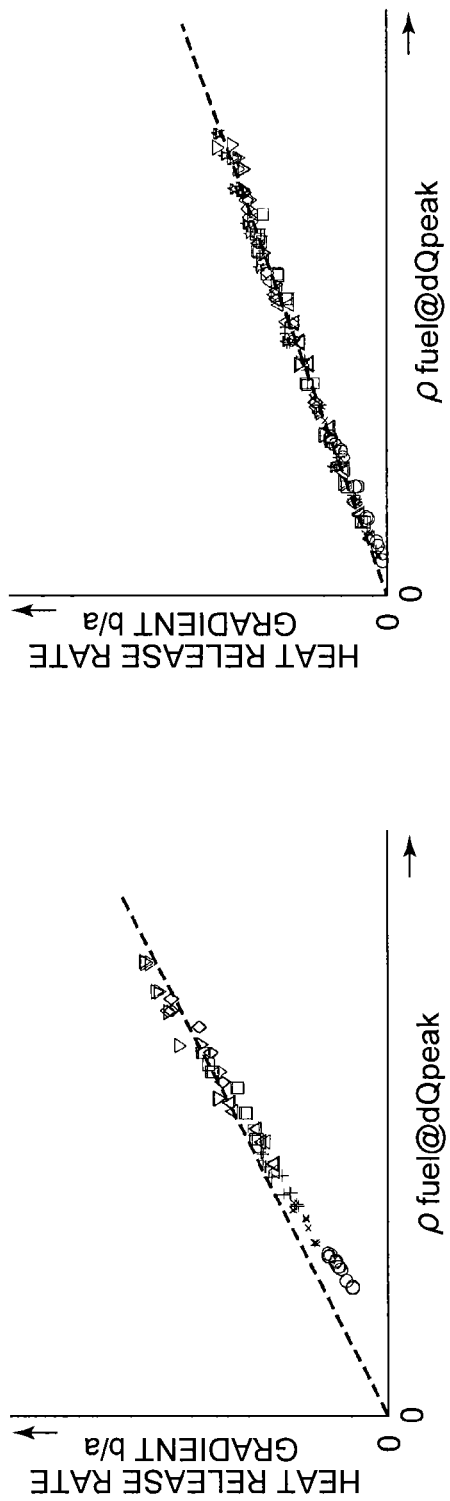
FIG. 22A to FIG. 22D are graphs show experimentally investigated results of the relationship between maximum heat release rate fuel densities and heat release rate gradients for mutually different engine rotation speeds.
Figure 22B:
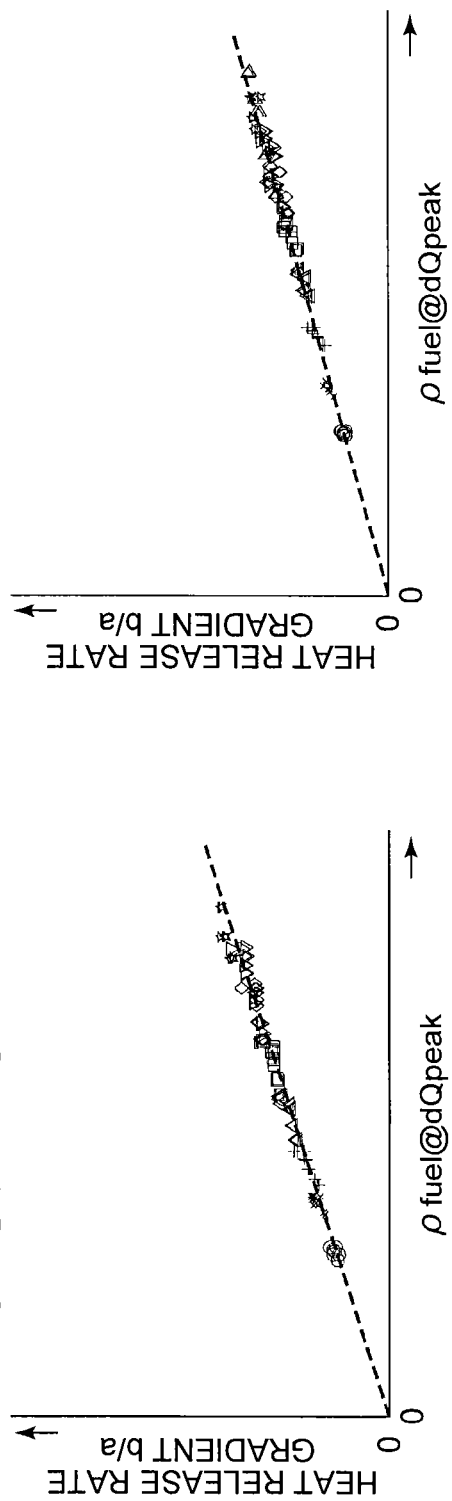
Figure 22C:
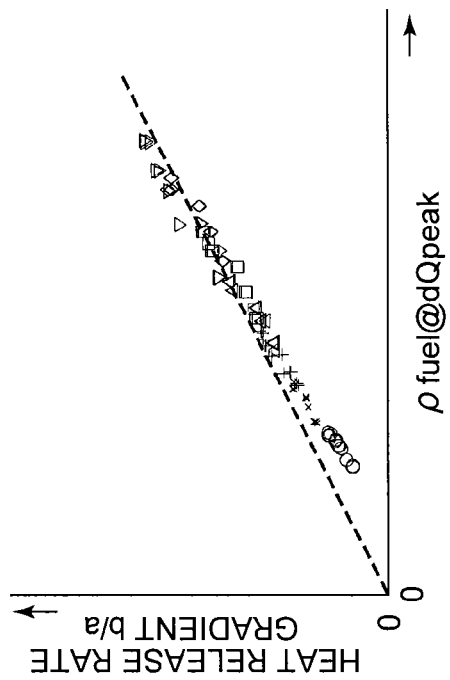
Figure 22D:
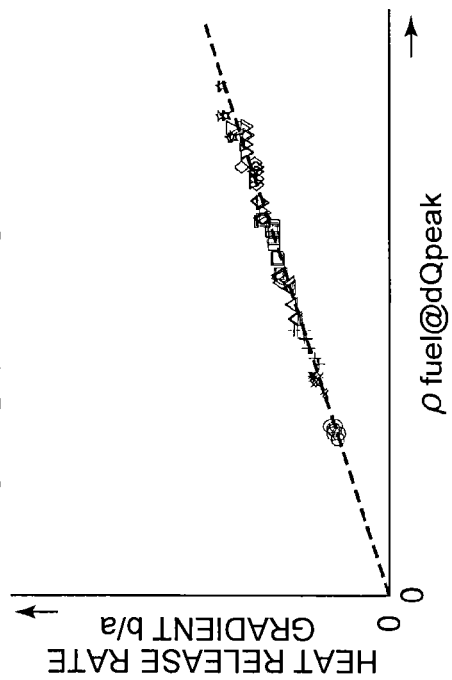

The engine rotation speed Ne increases in order of FIG. 22A to FIG. 22D. For example, FIG. 22A shows the case of 800 rpm, FIG. 22B shows the case of 1200 rpm, FIG. 22C shows the case of 2000 rpm, and FIG. 22D shows the case of 3200 rpm.

As shown in each of FIG. 22A to FIG. 22D, when the engine rotation speed is fixed, the relationship between the maximum heat release rate fuel density $\rho_{fuel@dQpeak}$ and the heat release rate gradient b/a is expressed substantially a single straight line even when the engine load factor or the spark timing SA is different, so it is clear that there is a high correlation between the maximum heat release rate fuel density $\rho_{fuel@dQpeak}$ and the heat release rate gradient b/a (specifically, roughly proportional relationship). That is, the influence of the load factor and spark timing SA of the engine on the heat release rate gradient b/a is collectively expressed by one parameter that is the maximum heat release rate fuel density $\rho_{fuel@dQpeak}$.

The inventor of the disclosure derived the mathematical expression (4) on the basis of this new findings.

It is possible to obtain the maximum heat release rate fuel density $\rho_{fuel@dQpeak}$ that is a variable in the mathematical expression (4) by dividing the in-cylinder fuel amount by the maximum heat release rate cylinder volume $V_{@dQpeak}$ as described above. The procedure of obtaining the maximum heat release rate cylinder volume $V_{@dQpeak}$ is as described above in the description of the first combustion period estimation unit 3. The in-cylinder fuel amount is given as information input to the heat release rate waveform calculation apparatus 1.

In this way, it is possible to basically calculate the heat release rate gradient b/a, which is one of the characteristic values of the heat release rate waveform, as the linear function (in this embodiment, proportional function as an example) of the maximum heat release rate fuel density $\rho_{fuel@dQpeak}$. In other words, it is possible to estimate the heat release rate gradient b/a mainly on the basis of the maximum heat release rate fuel density $\rho_{fuel@dQpeak}$ without consideration of the engine load factor and the spark timing SA, so man-hours for determining heat release rate gradients b/a in various operating conditions of the engine are reduced.

Heat Release Amount Estimation Unit

The heat release amount estimation unit 5 is a section that estimates the heat release amount generated in the whole combustion period (total heat release amount $Q_{all}$) as described above.

Hereinafter, the operation of estimating the total heat release amount $Q_{all}$, which is executed in the heat release amount estimation unit, will be described. In this estimation operation, the heat release amount Q1 in the first combustion period a is obtained, and then the total heat release amount $Q_{all}$ is calculated, and, after that, the heat release amount Q2 in the second combustion period c is calculated from these heat release amount Q1 and total heat release amount $Q_{all}$. The second combustion period c is calculated by using the heat release amount Q2. In this way, the characteristic values for determining the shape of the heat release rate waveform are obtained.

Initially, the heat release amount Q1 in the first combustion period a is geometrically calculated by the use of the following mathematical expression (5) with reference to FIG. 2.

$$Q_1 = \frac{1}{2} \times \frac{b}{a} \times a^2 \quad (5)$$

On the other hand, the total heat release amount $Q_{all}$ may be expressed as In-cylinder fuel amount×k (combustion efficiency) (this mathematical expression corresponds to the heat release amount estimation model). The combustion efficiency k decreases when the oil or coolant temperature is low, for example, during warm-up operation, and also changes with a change in engine load factor, engine rotation speed, or the like. In the present embodiment, a map for determining the combustion efficiency k in association with the oil or coolant temperature, the engine load factor and the engine rotation speed by the use of a database of experimental results of various engines is determined in advance. The total heat release amount $Q_{all}$ is calculated from the in-cylinder fuel amount by using the combustion efficiency k.

As described with reference to FIG. 2, the heat release rate b at the maximum heat release rate timing dQpeakA and the second combustion period c are required in order to generate a heat release rate waveform. The heat release amount Q2 in the second combustion period c is calculated by the use of the following mathematical expression (6).

$$Q_2 = Q_{all} - Q_1 \quad (6)$$

The heat release rate b at the maximum heat release rate timing dQpeakA is obtained from the following mathematical expression (7). The second combustion period c is obtained from the following mathematical expression (8).

$$b = \frac{b}{a} \times a \quad (7)$$

$$c = 2 \times \frac{Q_2}{b} \quad (8)$$

In this way, in the heat release rate waveform calculation apparatus 1, the ignition delay period τ is estimated in the ignition delay estimation unit 2 by the use of the ignition delay estimation model, the first combustion period a is estimated in the first combustion period estimation unit 3 by the use of the first combustion period estimation model, the heat release rate gradient b/a is estimated in the heat release rate gradient estimation unit 4 by the use of the heat release rate gradient estimation model and the heat release amount $Q_{all}$ is estimated in the heat release amount estimation unit 5 by the use of the heat release amount estimation model, and the maximum heat release rate b and the second combustion period c are calculated. A triangular waveform that is approximated to the heat release rate waveform as shown in FIG. 2 is generated by using these calculated values, and then the triangular waveform is output as the heat release rate waveform. A system, control and adapted values are studied at the time of engine design by utilizing the output heat release rate waveform.

In the above-described present embodiment, at the time of generating a triangular waveform that is approximated to the heat release rate waveform of the engine, the first combustion period a that is one of the characteristic values of the waveform is used. It is found as the new findings that the first combustion period a is not influenced by any of the operating parameters, that is, the engine load factor, the EGR rate, the air-fuel ratio, the oil or coolant temperature and the opening and closing timing of the exhaust valve. That is, the first combustion period a is calculated on the basis of the maximum heat release rate cylinder volume $V_{@dQpeak}$ and the engine rotation speed Ne (more specifically, the exponential function of the engine rotation speed Ne with an exponent of the value β commensurate with the tumble ratio) independent of any of the engine load factor, the EGR rate, the air-fuel ratio, the oil or coolant temperature and the opening and closing timing of the exhaust valve. In the present embodiment, the heat release rate waveform is generated on the basis of the first combustion period a. For this reason, it is not necessary to consider the operating parameters. Therefore, in comparison with the existing technique for generating a heat release rate waveform in consideration of the operating parameters, that is, the engine load factor, the EGR rate, the air-fuel ratio, the oil or coolant temperature and the opening and closing timing of the exhaust valve (by changing these operating parameters) (for example, a plurality of parameters (such as a shape parameter) are identified for various operating conditions by the use of the Wiebe function), it is possible to reduce man-hours for generating heat release rate waveforms while guaranteeing sufficient accuracy.

Thus, it is possible to reduce development cost by efficiently making various studies at the time of engine design by utilizing the heat release rate waveform.

A first combustion period a is calculated on the basis of the maximum heat release rate cylinder volume $V_{@dQpeak}$ and the engine rotation speed Ne, and a heat release rate waveform is generated on the basis of the first combustion period a. Therefore, the heat release rate waveform is generated in accordance with a physical phenomenon in a combustion state in the cylinder. In this respect, in comparison with a technique for generating a heat release rate waveform by the use of the Wiebe function that mathematically fits various parameters, such as a shape parameter, for the purpose of simply fitting a waveform shape, the heat release rate waveform generated by the heat release rate waveform calculation apparatus 1 according to the present embodiment provides high reliability.

In addition, in the present embodiment, even when the entire heat release rate waveform is not generated, it is possible to calculate the first combustion period a on the basis of the maximum heat release rate cylinder volume $V_{@dQpeak}$ and the engine rotation speed Ne as described above. Therefore, it is possible to easily estimate and evaluate the first combustion period a while ensuring desired accuracy.

As described above, the first combustion period a and the heat release rate gradient b/a that are estimated in the present embodiment are estimated as mutually independent (not dependent) values. Therefore, the first combustion period a is estimated as a value that is not influenced by an estimated error of the heat release rate gradient b/a when the estimated error is included in the heat release rate gradient b/a, and the heat release rate gradient b/a is estimated as a value that is not influenced by an estimated error of the first combustion period a when the estimated error is included in the first combustion period a. As a result, it is possible to ensure high estimation accuracy of these values.

Alternative Embodiments

In the above-described embodiment, the disclosure is applied to the heat release rate waveform calculation apparatus that generates a heat release rate waveform intended for a gasoline engine for an automobile. The disclosure is not limited to this configuration. The disclosure is applicable to a spark-ignition engine for other than an automobile. The disclosure is not specifically limited to a gasoline engine. The disclosure is also applicable to, for example, a gas engine.

A heat release rate waveform calculation method that is implemented in the heat release rate waveform calculation apparatus described in the embodiment also falls within the scope of the technical idea of the disclosure.

In the embodiment, an average rate of increase in heat release rate in the period from the ignition timing FA of air-fuel mixture to the maximum heat release rate timing dQpeakA is set as the heat release rate gradient b/a, and, as shown in the mathematical expression (4), the heat release rate gradient b/a is calculated as the linear function of the maximum heat release rate fuel density $\rho_{fuel@dQpeak}$; however, the disclosure is not limited to this configuration.

That is, while the heat release rate is increasing (heat release rate increasing period) within the period from the ignition timing FA to the maximum heat release rate timing dQpeakA, for example, the rate of increase in heat release rate in a period from the ignition timing to predetermined timing just before the maximum heat release rate timing dQpeakA may be set as a heat release rate gradient, and the heat release rate gradient may be estimated on the basis of a fuel density at the predetermined timing.

In the above-described embodiment, as a technique for obtaining the maximum heat release rate cylinder volume $V_{@dQpeak}$ and the first combustion period a, the virtual maximum heat release rate timing is set, and the maximum heat release rate cylinder volume $V_{@dQpeak}$ and the first combustion period a are calculated through repeated calculation of the mathematical expression (3). The disclosure is not limited to this configuration. The maximum heat release rate cylinder volume $V_{@dQpeak}$ and the first combustion period a may be obtained by sensing the maximum heat release rate timing in a test in an actual machine and then setting the maximum heat release rate timing on the basis of the sensed maximum heat release rate timing or inputting desired maximum heat release rate timing as an input signal to the heat release rate waveform calculation apparatus 1.

In addition, the manners of calculating the ignition delay period τ of air-fuel mixture in the above-described embodiment are also only illustrative, and the disclosure is not limited to these manners. For example, the ignition delay period τ may be determined by experiment or simulation.

The heat release rate waveform calculation apparatus 1 according to the embodiment outputs a triangular waveform. The disclosure is not limited to this configuration. The heat release rate waveform calculation apparatus 1 may generate a heat release rate waveform by applying predetermined filtering to a generated triangular waveform and then output the heat release rate waveform.

In the above-described embodiment, the cylinder volume is described as a physical quantity at the maximum heat release rate timing; instead, another physical quantity that defines the disturbance in the cylinder (that influences the disturbance in the cylinder) may be used.

According to the disclosure, it is possible to reduce man-hours for generating heat release rate waveforms in a spark-ignition internal combustion engine, and it is possible to reduce cost, so the disclosure is applicable to, for example, an internal combustion engine for an automobile.

What is claimed is:

1. A heat release rate waveform calculation apparatus for calculating a heat release rate waveform in a spark-ignition internal combustion engine, the heat release rate waveform calculation apparatus comprising:
an electronic controller configured to:

define a period from ignition timing to maximum heat release rate timing within a combustion period of air-fuel mixture as a first combustion period that is one of characteristic values of the heat release rate waveform, the maximum heat release rate timing being timing at which a heat release rate is maximum;

estimate the first combustion period based on a physical quantity at the maximum heat release rate timing irrespective of any of an engine load factor, an EGR rate, an air-fuel ratio, an oil or coolant temperature and opening and closing timing of an exhaust valve; and calculate the heat release rate waveform by using the estimated first combustion period, wherein the heat release rate waveform that is calculated is utilized to design the spark-ignition internal combustion engine.

2. The heat release rate waveform calculation apparatus according to claim 1, wherein
the electronic controller is configured to calculate the first combustion period based on a cylinder volume at the maximum heat release rate timing.

3. The heat release rate waveform calculation apparatus according to claim 2, wherein
the electronic controller is configured to calculate the first combustion period by multiplying the first combustion period by a correction coefficient based on an engine rotation speed.

4. The heat release rate waveform calculation apparatus according to claim 3, wherein
the correction coefficient based on the engine rotation speed is an exponential function of an engine rotation speed with an exponent of a value commensurate with a tumble ratio.

5. The heat release rate waveform calculation apparatus according to claim 1, wherein
the electronic controller is configured to:
set virtual maximum heat release rate timing;
compare a virtual first combustion period with the first combustion period estimated based on the physical quantity at the virtual maximum heat release rate timing, the virtual first combustion period being a period between the virtual maximum heat release rate timing and ignition timing obtained in accordance with actual spark timing;
calculate the estimated first combustion period in a case where the virtual first combustion period and the estimated first combustion period coincide with each other as a true first combustion period; and
calculate the heat release rate waveform by using the true first combustion period.

6. The heat release rate waveform calculation apparatus according to claim 1, wherein
the electronic controller is configured to:
approximate the heat release rate waveform by using a triangular waveform of which a base is a crank angle period from ignition of air-fuel mixture to an end of combustion and a vertex is a heat release rate at the maximum heat release rate timing; and
define a base of a triangle that expresses a heat release rate from the ignition timing to the maximum heat release rate timing in the triangular waveform as the first combustion period.

7. A heat release rate waveform calculation method for calculating a heat release rate waveform in a spark-ignition internal combustion engine, the heat release rate waveform calculation method comprising:

defining, with an electronic controller, a period from ignition timing to maximum heat release rate timing within a combustion period of air-fuel mixture as a first combustion period that is one of characteristic values of the heat release rate waveform, the maximum heat release rate timing being timing at which a heat release rate is maximum;

estimating, with the electronic controller, the first combustion period based on a physical quantity at the maximum heat release rate timing irrespective of any of an engine load factor, an EGR rate, an air-fuel ratio, an oil or coolant temperature and opening and closing timing of an exhaust valve;

calculating, with the electronic controller, the heat release rate waveform by using the estimated first combustion period; and designing the spark-ignition internal combustion engine utilizing the heat release rate waveform that is calculated.

8. The heat release rate waveform calculation method according to claim 7, wherein
the first combustion period is calculated based on a cylinder volume at the maximum heat release rate timing.

9. The heat release rate waveform calculation method according to claim 8, wherein
the first combustion period is calculated by multiplying the first combustion period by a correction coefficient based on an engine rotation speed.

10. The heat release rate waveform calculation method according to claim 9, wherein
the correction coefficient based on the engine rotation speed is the exponential function of an engine rotation speed with an exponent of a value commensurate with a tumble ratio.

11. The heat release rate waveform calculation method according to claim 7, wherein
virtual maximum heat release rate timing is set,
a virtual first combustion period is compared with the first combustion period estimated based on the physical quantity at the virtual maximum heat release rate timing, the virtual first combustion period being a period between the virtual maximum heat release rate timing and ignition timing obtained in accordance with actual spark timing,
the estimated first combustion period in a case where the virtual first combustion period and the estimated first combustion period coincide with each other is calculated as a true first combustion period, and
the heat release rate waveform is calculated by using the true first combustion period.

12. The heat release rate waveform calculation method according to claim 7, wherein
the heat release rate waveform is approximated by using a triangular waveform of which a base is a crank angle period from ignition of air-fuel mixture to an end of combustion and a vertex is a heat release rate at the maximum heat release rate timing, and
a base of a triangle that expresses a heat release rate from the ignition timing to the maximum heat release rate timing in the triangular waveform is defined as the first combustion period.

13. The heat release rate waveform calculation apparatus according to claim 5, wherein the estimated first combustion period is repeatedly calculated while changing the virtual maximum heat release rate timing.

14. The heat release rate waveform calculation method according to claim 11, wherein the estimated first combustion period is repeatedly calculated while changing the virtual maximum heat release rate timing.

* * * * *